(12) United States Patent
Osano et al.

(10) Patent No.: US 8,972,619 B2
(45) Date of Patent: Mar. 3, 2015

(54) PROCESSING SYSTEM, COMMUNICATION APPARATUS, AND PROCESSING APPARATUS

(71) Applicant: Fujitsu Limited, Kawasaki-shi (JP)

(72) Inventors: Hidekazu Osano, Hachioji (JP); Hideyuki Sakamaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/773,690

(22) Filed: Feb. 22, 2013

(65) Prior Publication Data
US 2013/0179602 A1 Jul. 11, 2013

Related U.S. Application Data

(63) Continuation of application No. PCT/JP2010/065614, filed on Sep. 10, 2010.

(51) Int. Cl.
G06F 3/00 (2006.01)
G06F 13/10 (2006.01)
G06F 13/14 (2006.01)
G06F 13/36 (2006.01)

(52) U.S. Cl.
CPC .............. *G06F 13/102* (2013.01); *G06F 13/14* (2013.01); *G06F 13/36* (2013.01)
USPC ......................................................... 710/14

(58) Field of Classification Search
None
See application file for complete search history.

(56) References Cited

U.S. PATENT DOCUMENTS 5,655,141 A * 8/1997 Ogden et al. ................... 712/23
7,631,125 B2 * 12/2009 Chinya et al. ................ 710/104
7,823,027 B2 10/2010 Itozawa et al.
2006/0277399 A1 * 12/2006 Sakamaki et al. ............. 712/300
2009/0083574 A1 * 3/2009 Kesch et al. ....................... 714/3
2009/0254738 A1 * 10/2009 Sato et al. ..................... 712/226
2010/0014418 A1 * 1/2010 Yonezawa et al. ............ 370/225
2011/0004740 A1 * 1/2011 Konno et al. ................... 712/30

FOREIGN PATENT DOCUMENTS

JP 1-191966 8/1989
JP 4-364627 12/1992
JP 2008-046996 2/2008

OTHER PUBLICATIONS

International Search Report, mailed in connection with PCT/JP2010/065614 and mailed Dec. 14, 2010.

* cited by examiner

*Primary Examiner* — Henry Tsai
*Assistant Examiner* — Aurangzeb Hassan
(74) *Attorney, Agent, or Firm* — Fujitsu Patent Center

(57) ABSTRACT

In a processing system including a processing apparatus, an input/output apparatus and communication apparatuses, the communication apparatus includes: a first instructing unit that issues a configuration change instruction in accordance with set configuration information to the processing apparatus and the input/output apparatus; and a first setting unit that, when an operation change completion notification corresponding to the configuration change instruction is received, sets the configuration information in accordance with a state established after a configuration change, and each of the processing apparatus and the input/output apparatus includes: a second setting unit that sets the configuration information in accordance with the configuration change instruction received from the communication apparatus; a second instructing unit that issues an operation change instruction in accordance with the set configuration information; and a notifying unit that, when the operation change is completed, issues an operation change completion notification to the communication apparatus.

10 Claims, 15 Drawing Sheets

PROCESSING SYSTEM, COMMUNICATION APPARATUS, AND PROCESSING APPARATUS

CROSS-REFERENCE TO RELATED APPLICATIONS

This application is a continuation Application of a PCT international application No. PCT/JP2010/065614 filed on Sep. 10, 2010 in Japan, the entire contents of which are incorporated by reference.

FIELD

The embodiment discussed herein relates to a processing system and a communication apparatus and a processing apparatus that configure the processing system.

BACKGROUND

Generally, as illustrated in FIG. 12, a computer system (processing system) 100 such as a server includes a plurality of processing apparatuses 110, a plurality of input/output apparatuses 120, and a plurality of communication apparatuses 130.

Each of the processing apparatuses 110 is configured as a system board including, for example, a CPU (central processing unit) 111, a DIMM (double inline memory module) 112, and a chip set 113. In FIG. 12, eight processing apparatuses 110 are provided and denoted by SB #0 to SB #7. In the following description, the processing apparatus may be referred to as a system board.

Each of the input/output apparatuses 120, for example, includes a PCI-X (peripheral components interconnect bus eXpress) card 121, a hard disk 122, and a chip set 123. In FIG. 12, eight input/output apparatuses 120 are illustrated and denoted by IOU (input/output unit) #0 to IOU #7. In the following description, the input/output apparatus may be denoted by IOU.

Each of the communication apparatuses 130, for example, includes a chip set 131 and connects the processing apparatus 110 and the input/output apparatus 120 to each other to exchange data. In FIG. 12, two of the same type of communication apparatuses 130 are illustrated. For example, a crossbar switch is used as the communication apparatus 130. In the following description, the communication apparatus may be referred to as a crossbar. Further, if one of the two crossbars is specified, reference numerals 130-0 and 130-1 are used. Reference numeral 130 is used to denote an arbitrary crossbar. In the drawings, the crossbar 130-0 may be denoted as crossbar #0 and the crossbar 130-1 may be denoted as crossbar #1.

A usage state of two crossbars 130 includes a non-redundant state and a redundant state. The non-redundant state, as illustrated in FIG. 13, indicates a state in which two crossbars 130 exchange different data (packets #A and #B), that is, two crossbars are concurrently used to improve the performance of the system 100. The non-redundant state is referred to as a unification state or non-mirror state. The redundant state, as illustrated in FIG. 14, indicates a state in which two crossbars 130 exchange same data (packet #A), that is, two crossbars are synchronized to perform the same communication operation to improve a reliability of the system 100. The redundant state is referred to as a duplication state or mirror state.

In order to set the above-mentioned usage state, as illustrated in FIG. 15, each of the crossbars 130 includes a register 132 and a configuration setting circuit 133. Each of the processing apparatuses 110 includes a register 114 and a configuration setting circuit 115 and each of the input/output apparatuses 120 includes a register 124 and a configuration setting circuit 125. Further, in FIG. 15, only SB #0 is illustrated as the processing apparatus 110 and only IOU #0 is illustrated as the input/output apparatus 120. In addition, in FIG. 15, an internal configuration of the crossbar 130-1 is illustrated but an internal configuration of the crossbar 130-0 is omitted. However, the internal configuration of the crossbar 130-0 is the same as the internal configuration of the crossbar 130-1.

A terminal apparatus (not illustrated) such as a personal computer (PC) is connected to the registers 132, 114, and 124. When the system 100 starts up, a desired usage state [non-redundant state (unification state) or redundant state (duplication state)] is set in the registers 132, 114, and 124 through the terminal apparatus. In other words, a usage state of a self crossbar 130 is set in the register 132 of each of the crossbars 130 as a configuration and the usage state of the crossbar 130 which is connected to each of the processing apparatuses 110 is set in the register 114 of each of the processing apparatuses 110 as a configuration. Similarly, the usage state of the crossbar 130 which is connected to each of the input/output apparatuses 120 is set in the register 124 of each of the input/output apparatuses 120 as a configuration.

If the configuration is set in the register 132 of each of the crossbars 130, the configuration setting circuit 133 of each of the crossbars 130 performs various settings so that each of the crossbars 130 performs an operation according to the configuration set in the register 132. If the configuration is set in the register 114 of each of the processing apparatuses 110, the configuration setting circuit 115 of each of the processing apparatuses 110 performs various settings so that each of the processing apparatuses 110 performs an operation according to the configuration set in the register 114. Similarly, if the configuration is set in the register 124 of each of the input/output apparatuses 120, the configuration setting circuit 125 of each of the input/output apparatuses 120 performs various settings so that each of the input/output apparatuses 120 performs an operation according to the configuration set in the register 124.

As described above, in the system 100 of the related art, the registers 132, 114, and 124 instruct a configuration (usage state of the crossbar 130) determined when the system 100 starts up to the configuration setting circuits 133, 115, and 125, respectively. In the system 100 of the related art, since the change of the configuration during the operation after starting up the system 100 is not considered, the settings of the resisters 132, 114, and 124 are not able to be changed while the system 100 operates.

Therefore, if any one of two crossbars 130 is exchanged or the usage state of the two crossbars 130 is changed from the unification state to the duplication state or from the duplication state to the unification state, an operator may manipulate as follows. When the crossbar 130 is exchanged, the operator temporally stops the system 100. Further, when the system 100 restarts up after exchanging the crossbar 130, the operator needs to set the usage state of the exchanged crossbar in the registers 132, 114, and 124 through the terminal apparatus. Further, if the usage state is changed, the operator temporally stops the system 100 and when the system 100 restarts up, the operator needs to set a changed usage state in the registers 132, 114, and 124 through the terminal apparatus.

[Patent Literature 1] Japanese Laid-open Patent Publication No. 1992-364627

SUMMARY

As described above, when the crossbar 130 is exchanged or the usage state of the crossbar 130 is changed, the operator needs to stop the entire system 100 and set the configuration for the registers 132, 114, and 124 in the plurality of crossbars 130, the plurality of processing apparatuses 110, and the plurality of input/output apparatuses 120 from the terminal apparatus. Therefore, when the crossbar 130 is exchanged or the configuration is changed, it needs to be performed by the operator and it takes more time to stop the system 100, which is undesirable in the operation.

The processing system of the embodiments includes one or more processing apparatuses, one or more input/output apparatuses, and two or more communication apparatuses that connect the one or more processing apparatuses and the one or more input/output apparatuses to exchange data among the one or more processing apparatuses and the one or more input/output apparatuses. Each of the communication apparatuses includes a first holding unit, a first instructing unit, and a first setting unit. The first holding unit holds configuration information of the communication apparatus. The first instructing unit, when the configuration information is set in the first holding unit, issues a configuration change instruction in accordance with the set configuration information to the one or more processing apparatuses and the one or more input/output apparatuses which are connected to the communication apparatus. Further, when the first setting unit receives an operation change completion notification corresponding to the configuration change instruction from the one or more processing apparatuses and the one or more input/output apparatuses which are connected to the communication apparatus, the first setting unit sets the configuration information in accordance with a state established after configuration change in the first holding unit. Each of the one or more processing apparatuses and the one or more input/output apparatuses include a second holding unit, a second setting unit, a second instructing unit, and a notifying unit. The second holding unit holds the configuration information of the communication apparatuses connected with the processing apparatus or the input/output apparatus. When the second setting unit receives the configuration change instruction from the connected communication apparatuses, the second setting unit sets the configuration information in accordance with the configuration change instruction in the second holding unit. When the configuration information is set in the second holding unit, the second instructing unit issues an operation change instruction corresponding to the configuration change to the processing apparatus or the input/output apparatus. When the processing apparatus or the input/output apparatus completes an operation change, the notifying unit issues an operation change completion notification to the communication apparatuses.

Further, the communication apparatus and the processing apparatus of the present invention configure the above-mentioned processing system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings.

[1] Configuration of Processing System

Figure 1:
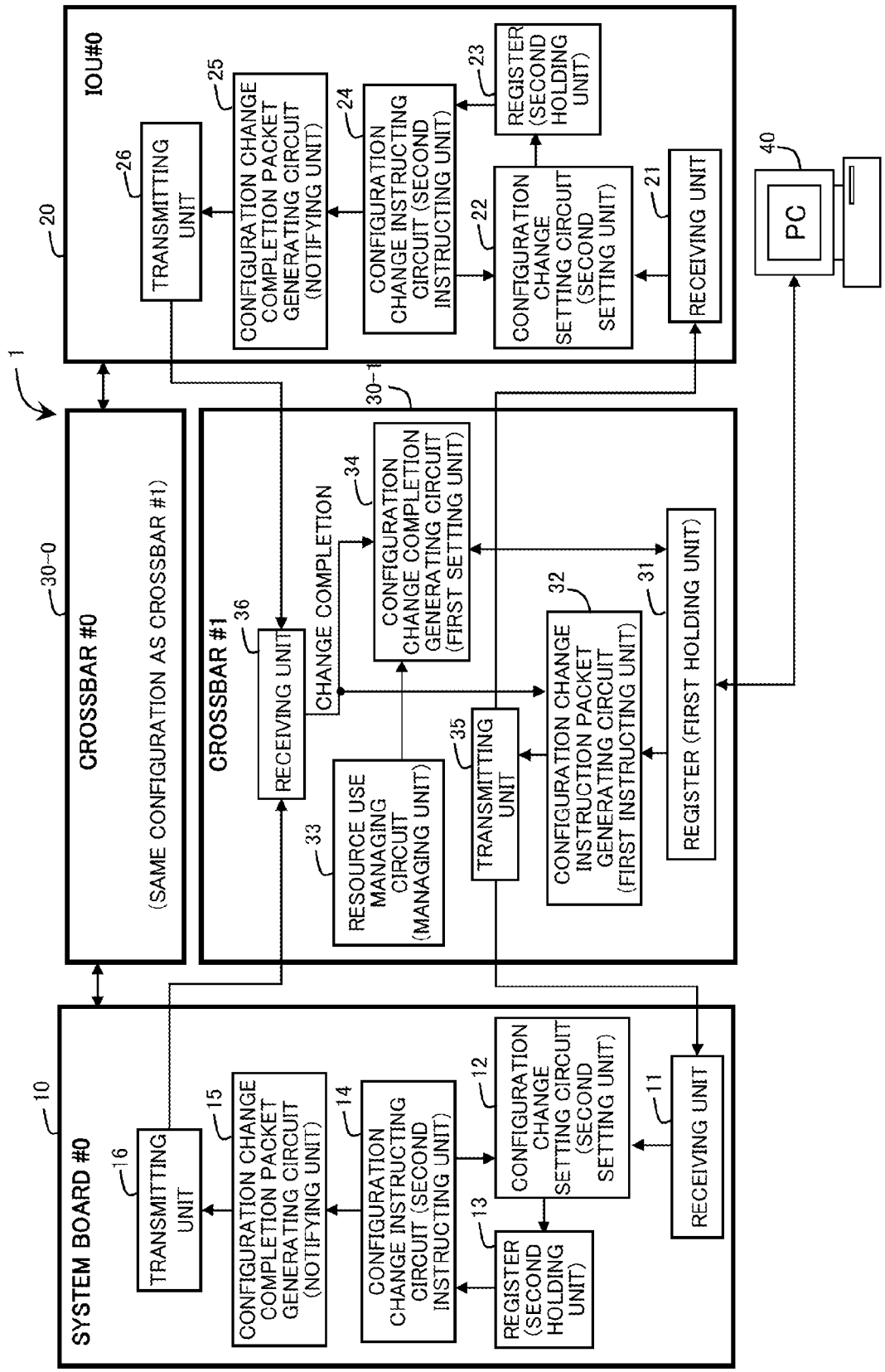
FIG. 1 is a block diagram illustrating a configuration of a processing system according to an embodiment.

FIG. 1 is a block diagram illustrating a configuration of a processing system according to an embodiment. A processing system (computer system) 1 of the embodiment includes a plurality of processing apparatuses 10, a plurality of input/output apparatuses 20, and a plurality of communication apparatuses 30, which is similar to the general processing system 100 illustrated in FIG. 12.

Each of the processing apparatuses 10 is configured as a system board SB, for example, including a CPU, a DIMM, and a chip set, which is similar to the above-mentioned processing apparatuses 110. In FIG. 1, only SB #0 is illustrated as the processing apparatus 10.

Each of the input/output apparatuses 20, for example, includes a PCI-X card, a hard disk, and a chip set, which is similar to the above-mentioned input/output apparatus 120. In FIG. 1, only SB #0 is illustrated as the processing apparatus 10 and only IOU #0 is illustrated as the input/output apparatus 20.

Similarly to the above-described communication apparatus 130, each of the communication apparatuses 30, for example, includes a chip set and connects the processing apparatus 10 and the input/output apparatus 20 to each other to exchange data. In FIG. 1, two of the same types of communication apparatuses 30 are illustrated. For example, a crossbar switch is used as the communication apparatus 30. In the following description, the communication apparatus may be referred to as a crossbar. Note that, if one of two crossbars is specified, reference numerals 30-0 and 30-1 are used. Reference numeral 30 is used to denote an arbitrary crossbar. In the drawings, the crossbar 30-0 may be denoted as crossbar #0 and the crossbar 30-1 may be denoted as crossbar #1.

Each of the crossbars 30 includes a register 31, a configuration change instruction packet generating circuit 32, a resource use managing circuit 33, a configuration change completion generating circuit 34, a transmitting unit 35, and a receiving unit 36. The transmitting unit 35 and the receiving unit 36 are implemented by a packet transceiving function which is inherently contained in each of the crossbars 30. Functions as the register 31, the configuration change instruction packet generating circuit 32, the resource use managing circuit 33, and the configuration change completion generating circuit 34 are implemented, for example, by the chip set (see reference numeral 131 of FIG. 12). Specifically, the functions as the configuration change instruction packet generating circuit 32, the resource use managing circuit 33, and the configuration change completion generating circuit 34 are implemented by executing a predetermined program in the chip set.

Each of the processing apparatuses 10 includes a receiving unit 11, a configuration change setting circuit 12, a register 13, a configuration change instructing circuit 14, a configuration change completion packet generating circuit 15, and a transmitting unit 16. The receiving unit 11 and the transmitting unit 16 are implemented by a packet transceiving function which is inherently contained in each of the processing apparatuses 10. Functions as the configuration change setting circuit 12, the register 13, the configuration change instructing circuit 14, and the configuration change completion packet generating circuit 15 are, for example, implemented by a CPU, a DIMM, and a chip set (see reference numerals 111, 112, and 113 of FIG. 12). Specifically, the functions as the configuration change setting circuit 12, the configuration change instructing circuit 14, and the configuration change completion packet generating circuit 15 are implemented by executing a predetermined program in the CPU, the chip set, and the like.

Each of the input/output apparatuses 20 includes a receiving unit 21, a configuration change setting circuit 22, a register 23, a configuration change instructing circuit 24, a configuration change completion packet generating circuit 25, and a transmitting unit 26. The receiving unit 21 and the transmitting unit 26 are implemented by a packet transceiving function which is inherently contained in each of the input/output apparatuses 20. Functions as the configuration change setting circuit 22, the register 23, the configuration change instructing circuit 24, and the configuration change completion packet generating circuit 25 are, for example, implemented by a hard disk and a chip set (see reference numerals 122 and 123 of FIG. 12). Specifically, the functions as the configuration change setting circuit 22, the configuration change instructing circuit 24, and the configuration change completion packet generating circuit 25 are implemented by executing a predetermined program in the chip set and the like.

Here, first, the register 31, the configuration change instruction packet generating circuit 32, the resource use managing circuit 33, and the configuration change completion generating circuit 34 which are included in each of the crossbars 30 will be described.

The register 31 is a first holding unit that sets and holds configuration information of the crossbar 30 that has the register 31. A personal computer (PC) 40 is connected to the register 31 in at least one of the two crossbars 30 (the crossbar 30-1 in FIG. 1). The PC 40 has a function as a configuration information setting unit that sets configuration information of the crossbar 30-1 in the connected register 31 by register-writing (issue crossbar dynamic change instruction: see FIG. 4). Further, the PC 40 has a function to read out the configuration information held in the connected register 31 by polling register-reading (acquire crossbar configuration information: see FIG. 4). If one of the crossbars 30 is exchanged as described below, the PC 40 is connected to a registers 31 of a crossbar 30 to be exchanged and a register 31 of a new crossbar 30 after the exchange. Note that, the PC 40 is connected to registers 31 of all crossbars 30, as appropriate. Further, in the register 31 of each of the crossbars 30, configuration information of the crossbar 30 that has the register 31 is set by the configuration change completion generating circuit (an example of a first setting unit) 34 (hereinafter, also simply referred to as a "generating circuit 34"), which will be described below.

Figure 2:
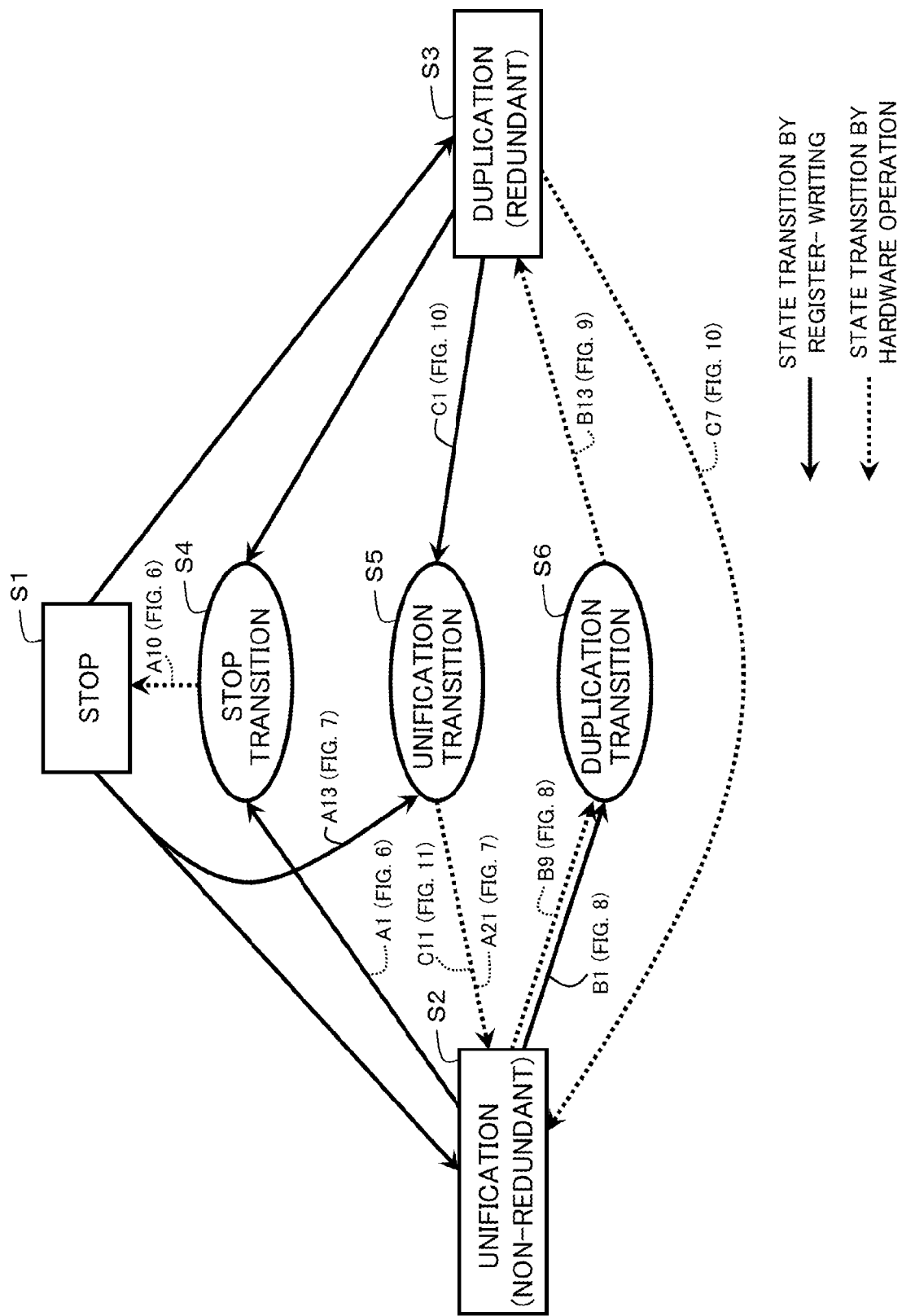
FIG. 2 is a state transition view of a resister (first holding unit) in a crossbar of the processing system illustrated in FIG. 1.

The configuration information set in the register 31 is any one of following six types of information S1 to S6, as illustrated in FIG. 2. Note that, FIG. 2 is a state transition view of the register 31 in the crossbar 30.

(1) First information S1 indicating that the crossbar 30 is in a stopped state in which each crossbar 30 stops an operation. Hereinafter, the first information S1 or the stopped state is denoted as a stopped state S1.

(2) Second information S2 indicating that two crossbars 30 are in a non-redundant state (unification state) in which each of the two crossbars 30 exchanges different data. Hereinafter, the second information S2 or the non-redundant state is denoted as a unification state S2.

(3) Third information S3 indicating that two crossbars 30 are in a redundant state (duplication state) in which the two crossbars 30 exchange same data. Hereinafter, the third information S3 or the redundant state is denoted as a duplication state S3.

(4) Fourth information S4 indicating that each of the crossbars 30 is in a stop transition state in which each of the crossbars 30 is transited from the unification state S2 or the duplication state S3 into the stopped state S1. Hereinafter, the fourth information S4 or the stop transition state is denoted as a stop transition state S4.

(5) Fifth information S5 indicating that each of the crossbars 30 is in a redundant transition state in which each of the crossbars 30 is transited from the unification state S2 into the duplication state S3. Hereinafter, the fifth information S5 or the redundant transition state is denoted as a duplication transition state S5.

(6) Sixth information S6 indicating that each of the crossbars 30 is in a non-redundant transition state in which each of the crossbars 30 is transited from the duplication state S3 into the unification state S2. Hereinafter, the sixth information S6 or the non-redundant transition state is denoted as a unification transition state S6.

As illustrated in FIG. 2, the transition from the stopped state S1 into the unification state S2, the duplication state S3, or the unification transition state S5 or the transition from the unification state S2 into the stop transition state S4 or the duplication transition state S6 in the register 31 is performed by the register-writing of the PC 40. Similarly, the transition from the duplication state S3 into the stop transition state S4 or the unification transition state S5 is also performed by the register-writing of the PC 40. In the meantime, the transition from the stop transition state S4 into the stopped state S1 or the transition from the unification transition state S5 into the unification state S2 in the register 31 is performed by a hardware operation, that is, the configuration change completion generating circuit 34, which will be described below. Similarly, the transition from the unification state S2 into the duplication transition state S6 or the transition from the duplication transition state S6 into the duplication state S3 or the transition from the duplication state S3 into the unification state S2 is performed by a hardware operation, that is, the configuration change completion generating circuit 34, which will be described below.

The configuration change instruction packet generating circuit (an example of a first instructing unit) 32 (hereinafter, also simply referred to as "generating circuit 32") generates a packet that issues a configuration change instruction of the crossbar (self crossbar) 30 that has the generating circuit 32 and the transmitting unit 35 transmits the packet to the processing apparatus 10 and the input/output apparatus 20 which are connected to the self crossbar 30. Specifically, the generating circuit 32 performs at least the following functions (11) to (17).

Figure 6:
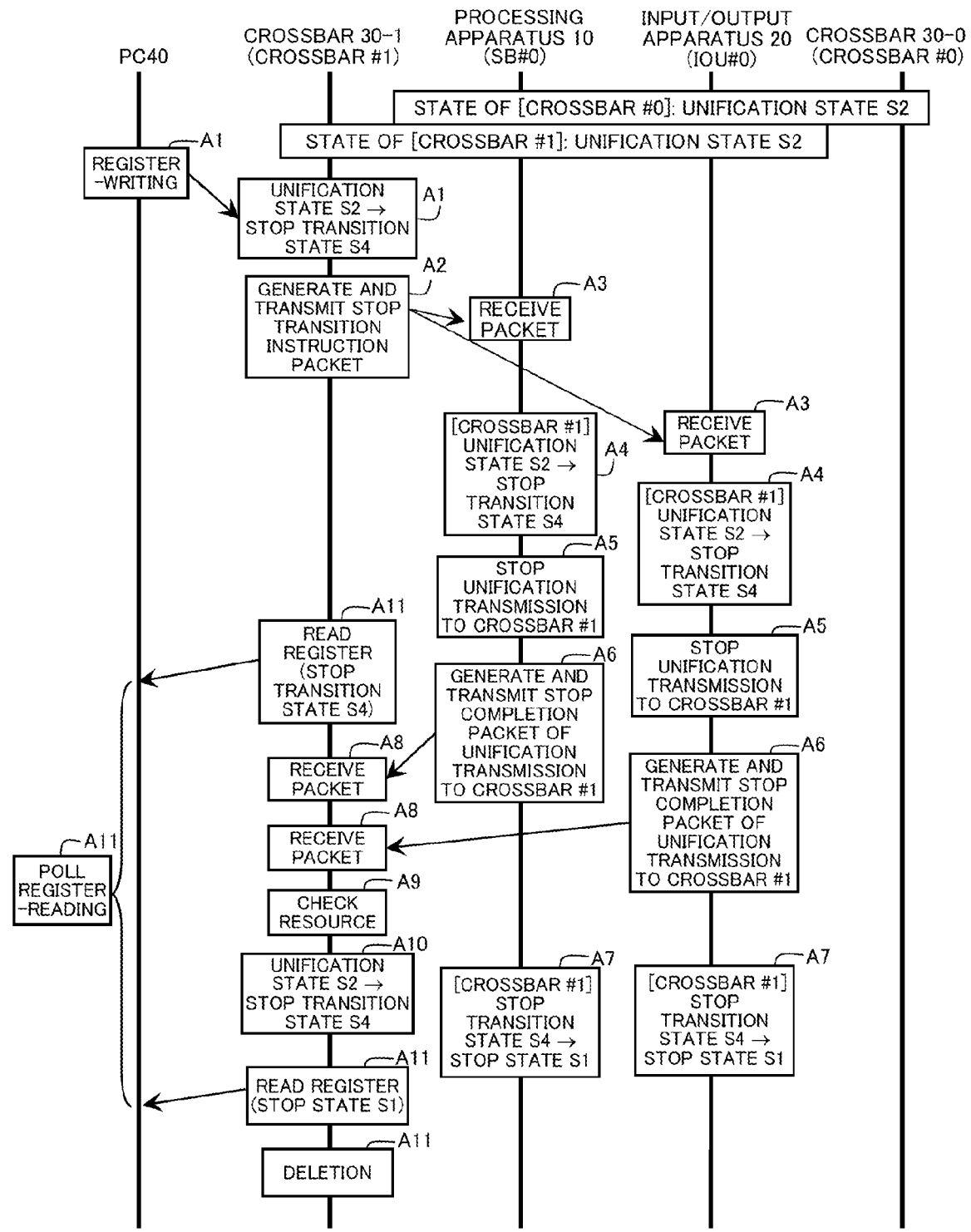
FIG. 6 is a sequential view illustrating a dynamic exchange procedure (crossbar deleting procedure) of the unification crossbar in the processing system illustrated in FIGS. 1 and 4.

(11) When the crossbar 30 is in the unification state S2 or the duplication state S3, if the stop transition state S4 is set in the register 31 by the register-writing of the PC 40, the generating circuit 32 generates a packet that issues a stop transition instruction and the transmitting unit 35 transmits the packet to the processing apparatus 10 and the input/output apparatus 20 which are connected to the crossbar 30 (see A1 and A2 of FIG. 6).

Figure 7:
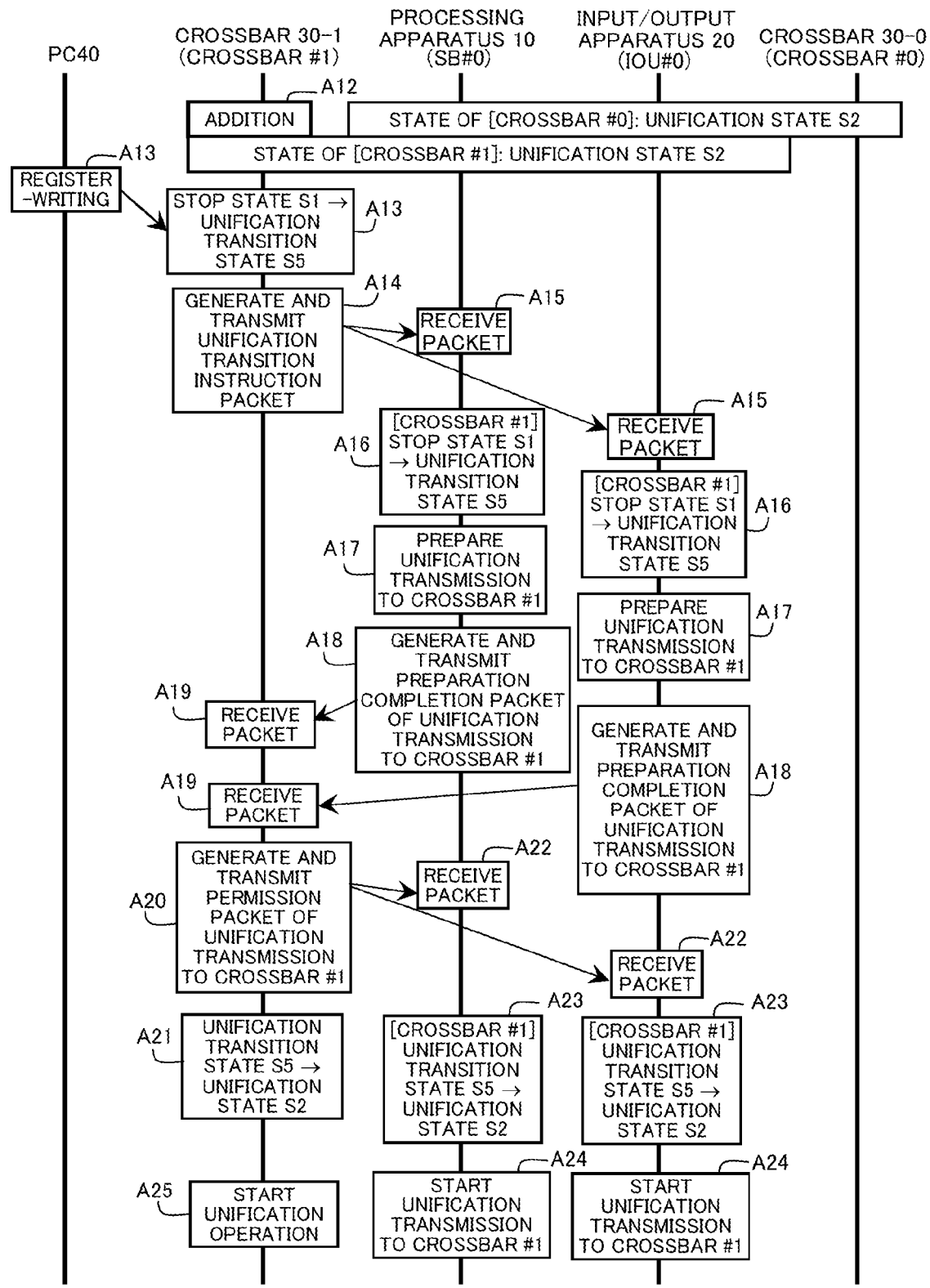
FIG. 7 is a sequential view illustrating a dynamic exchange procedure (crossbar adding procedure) of the unification crossbar in the processing system illustrated in FIGS. 1 and 4.

(12) When the crossbar 30 is in the stopped state S1, if the unification transition state S5 is set in the register 31 by the register-writing of the PC 40, the generating circuit 32 generates a packet that issues a unification transition instruction and the transmitting unit 35 transmits the packet to the processing apparatus 10 and the input/output apparatus 20 which are connected to the crossbar 30 (see A13 and A14 of FIG. 7).

(13) When a new crossbar 30 is in the unification transition state S5, if the receiving unit 36 receives a preparation completion notification of unification transmission from all processing apparatuses 10 and all input/output apparatuses 20 to which the new crossbar 30 is connected, the generating circuit 32 generates a packet that issues the information transmission permission in accordance with the unification (hereinafter, referred to as "unification transmission") and the transmitting unit 35 transmits the packet to the processing apparatus 10 and the input/output apparatus 20 which are connected to the new crossbar 30 (see A19 and A20 of FIG. 7).

Figure 8:
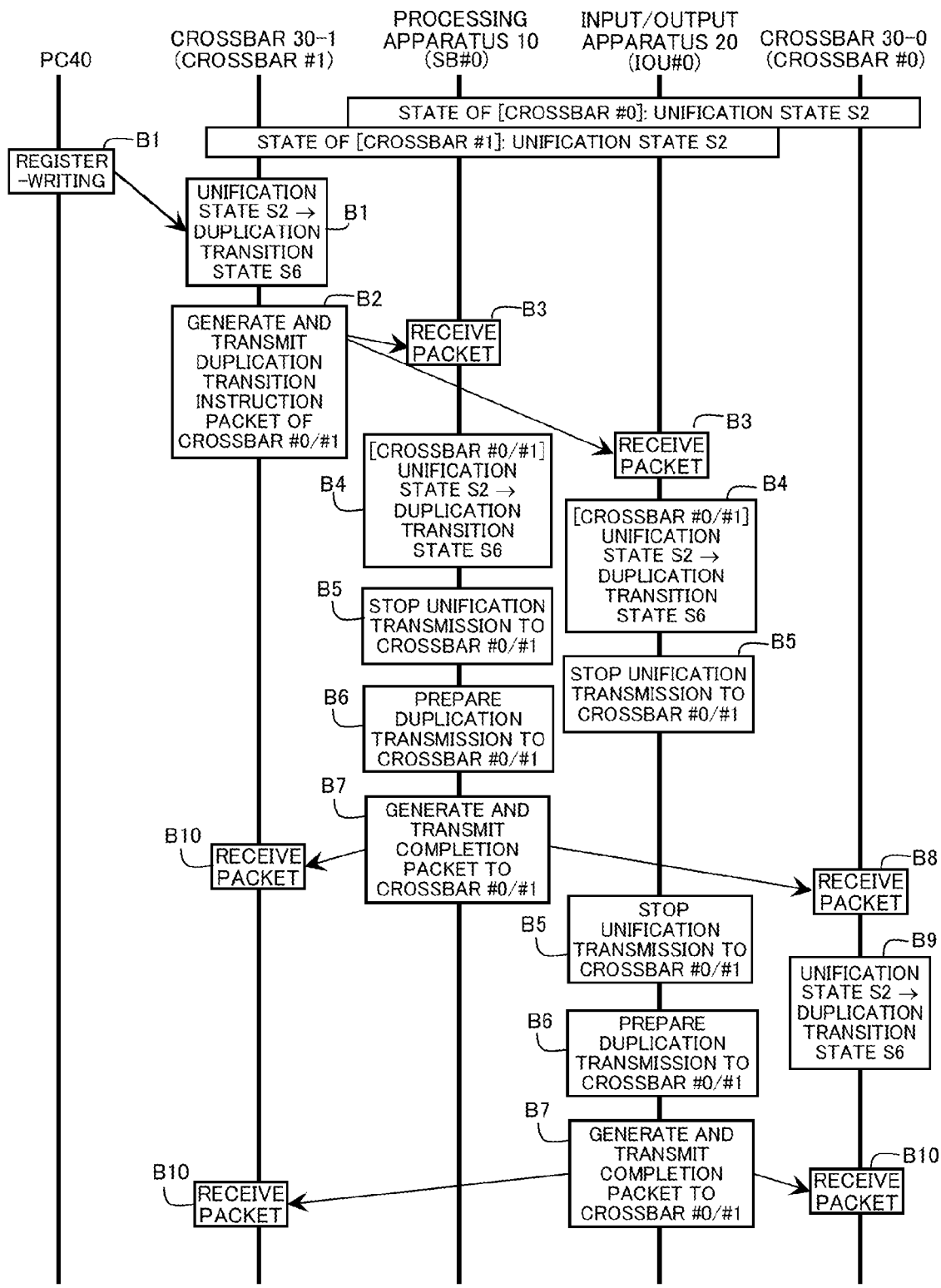
FIG. 8 is a sequential view illustrating a dynamic duplicating procedure (procedure from the unification state to the stopped state) of the unification crossbar in the processing system illustrated in FIGS. 1 and 4.

(14) When the crossbar 30 is in the unification state S2, if the duplication transition state S6 is set in the register 31 by the register-writing of the PC 40, the generating circuit 32 generates a packet that issues a duplication transition instruction and the transmitting unit 35 transmits the packet to the processing apparatus 10 and the input/output apparatus 20 which are connected to the crossbar 30 (see B1 and B2 of FIG. 8).

(15) When the crossbar 30 is in the duplication transition state S6, if the crossbar 30 is in a duplication operable state, the generating circuit 32 generates a packet that issues the information transmission permission in accordance with the duplication (hereinafter, referred to as "duplication transmission") and the transmitting unit 35 transmits the packet to the processing apparatus 10 and the input/output apparatus 20 which are connected to the crossbar 30 (see B10 to B12 of FIGS. 8 and 9).

Figure 10:
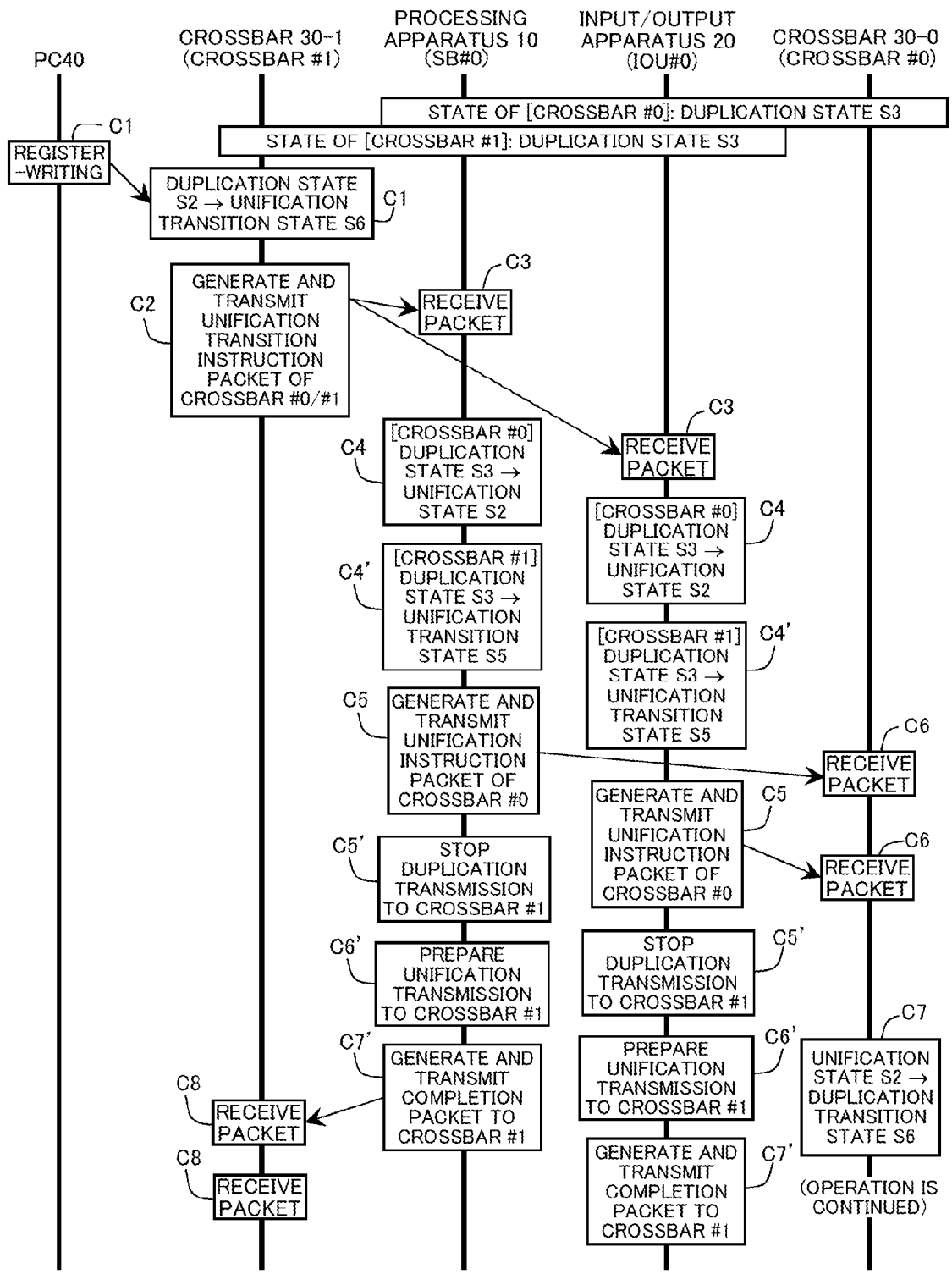
FIG. 10 is a sequential view illustrating a dynamic unification procedure (procedure from the duplication state to the unification state of one side) of the duplication crossbar in the processing system illustrated in FIGS. 1 and 4.

(16) When the crossbar 30 is in the duplication state S3, if the unification transition state S5 is set in the register 31 by the register-writing of the PC 40, the generating circuit 32 generates a packet that issues a unification transition instruction and the transmitting unit 35 transmits the packet to the processing apparatus 10 and the input/output apparatus 20 which are connected to the crossbar 30 (see C1 and C2 of FIG. 10).

Figure 11:
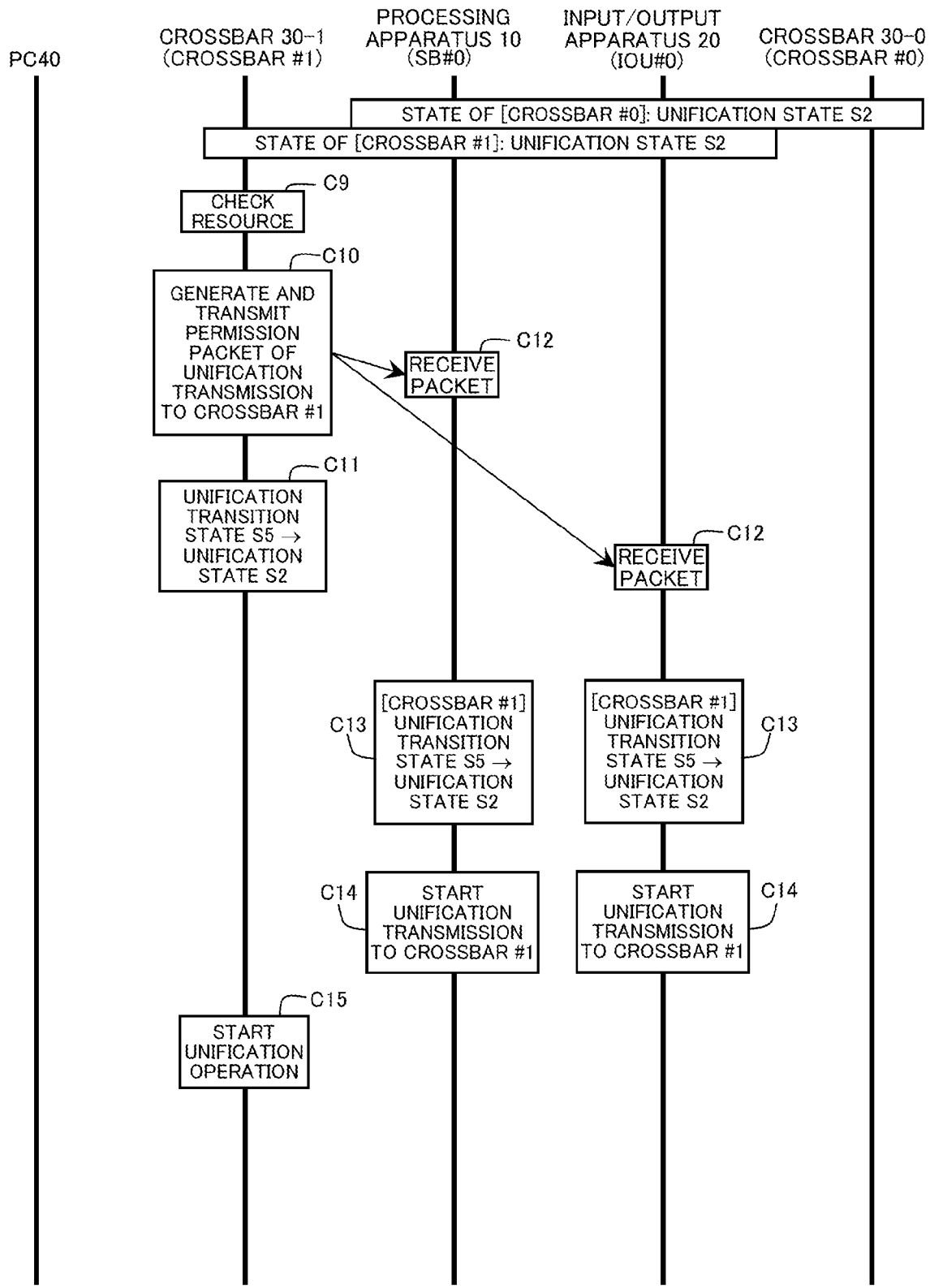
FIG. 11 is a sequential view illustrating a dynamic unification procedure (procedure from the unification state of one side to the unification state of both sides) of the duplication crossbar in the processing system illustrated in FIGS. 1 and 4.

(17) When the crossbar 30 is in the unification transition state S5, if the crossbar 30 is in a unification operable state, the generating circuit 32 generates a packet that issues the unification transmission permission and the transmitting unit 35 transmits the packet to the processing apparatus 10 and the input/output apparatus 20 which are connected to the crossbar 30 (see C8 to C10 of FIGS. 10 and 11).

The resource use managing circuit (an example of managing unit, hereinafter, also simply referred to as a "managing circuit") 33 manages a usage condition of a resource in the crossbar 30 that has the managing circuit 33. The managing circuit 33 manages, for example, how much a queue that stores the packets is used as the usage condition of the resource. The usage condition of the resource which is managed by the managing circuit 33 is used as information to determine whether the crossbar 30 is operable when the crossbar 30 is switched from the stop transition state S4 into the stopped state S1 or from the unification transition state S5 into the unification state S2 or from the duplication transition state S6 into the duplication state S3.

The configuration change completion generating circuit 34 operates when the stop transition state S4, the unification transition state S5, or the duplication transition state S6 is set in the register 31. The generating circuit 34 receives an operation change completion notification corresponding to the configuration change instruction from the processing apparatus 10 and the input/output apparatus 20 which are connected to the self crossbar 30 through the receiving unit 36 and if the managing circuit 33 checks that all resources of the self crossbar 30 are in an unused state, issues a configuration change completion notification to the register 31. The generating circuit 34 sets configuration information in accordance with a state established after the configuration change by issuing the configuration change completion notification to the resister 31. Specifically, the generating circuit 34 performs at least the following functions (21) to (26).

(21) When the crossbar 30 is in the stop transition state S4, the receiving unit 36 receives the unification transmission stop completion notification from all processing apparatuses 10 and all the input/output apparatuses 20 which are connected to the crossbar 30 and if the managing circuit 33 checks that all resources of the crossbar 30 are in the unused state, the generating circuit 34 sets the stopped state S1 in the register 31 (see A8 to A10 of FIG. 6).

(22) When the new crossbar 30 is in the unification transition state S5, if the receiving unit 36 receives the preparation completion notification of the unification transmission from the processing apparatus 10 and the input/output apparatus 20 to which the new crossbar 30 is connected, the generating circuit 34 sets the unification state S2 in the register 31 (see A19 and A21 of FIG. 7).

(23) When the crossbar 30 is in the unification state S2, if the receiving unit 36 receives completion notifications of the unification transmission stop and the duplication transmission preparation from one of the processing apparatus 10 and the input/output apparatus 20 which are connected to the crossbar 30, the generating circuit 34 sets the duplication transition state S6 in the register 31 (see B8 and B9 of FIG. 8).

Figure 9:
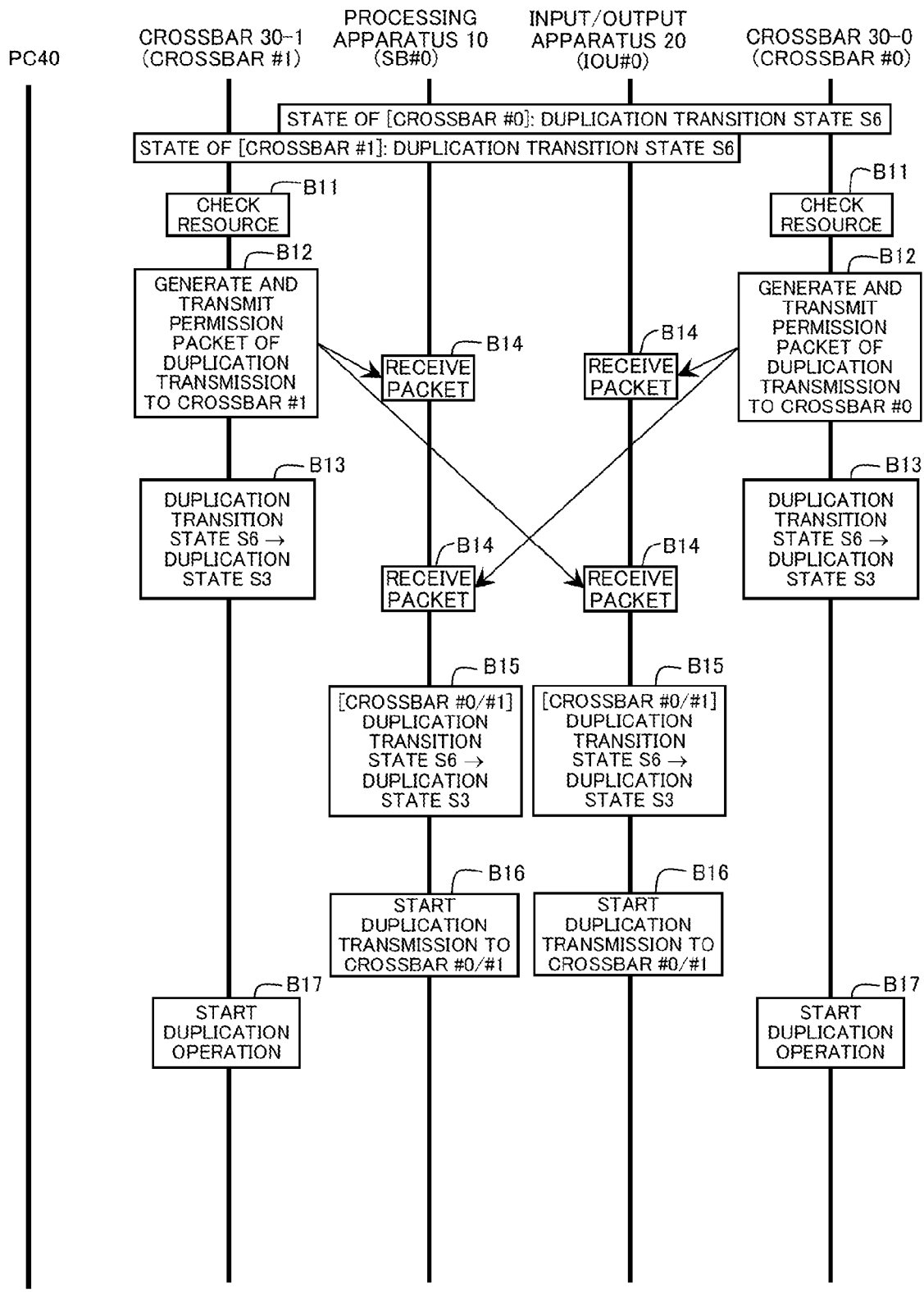
FIG. 9 is a sequential view illustrating a dynamic duplicating procedure (procedure from the stopped state to the duplication state) of the unification crossbar in the processing system illustrated in FIGS. 1 and 4.

(24) When the crossbar 30 is in the duplication transition state S6, the receiving unit 36 receives the completion notifications of the unification transmission stop and the duplication transmission preparation from all processing apparatuses 10 and all input/output apparatuses 20 which are connected to the crossbar 30 and if the managing circuit 33 checks that all resources of the crossbar 30 are in the unused state, the generating circuit 34 sets the duplication state S3 in the register 31 (see B10, B11, and B13 of FIGS. 8 and 9).

(25) When the crossbar 30 is in the duplication state S3, if the receiving unit 36 receives completion notifications of the duplication transmission stop and the unification transmission preparation from one of the processing apparatuses 10 and one of the input/output apparatuses 20 which are connected to the crossbar 30, the generating circuit 34 sets the unification state S2 in the register 31 (see C6 and C7 of FIG. 10).

(26) When the crossbar 30 is in the unification transition state S5, the receiving unit 36 receives the completion notifications of the duplication transmission stop and the unification transmission preparation from all processing apparatuses 10 and all input/output apparatuses 20 which are connected to the crossbar 30 and if the managing circuit 33 checks that all resources of the crossbar 30 are in the unused state, the generating circuit 34 sets the unification state S2 in the register 31 (see C8, C9, and C11 of FIGS. 10 and 11).

Continuously, the configuration change setting circuit 12, the register 13, the configuration change instructing circuit 14, and the configuration change completion packet generating circuit 15 which are included in each of the processing apparatuses 10 will be described.

The register 13 is a second holding unit that sets and holds configuration information of the crossbar 30 which is connected to the processing apparatus 10 that has this register 13. In the register 13, configuration information of each of the crossbars 30 is set based on a packet which is received by the receiving unit 11 or the change completion notification from the configuration change instructing circuit (an example of a second instructing unit) 14 (hereinafter, also simply referred to as a "instructing circuit 14"), which will be described below, by the configuration change setting circuit (an example of a second setting unit) 12 (hereinafter, also simply referred to as a "setting circuit 12"), which will be described below.

Figure 3:
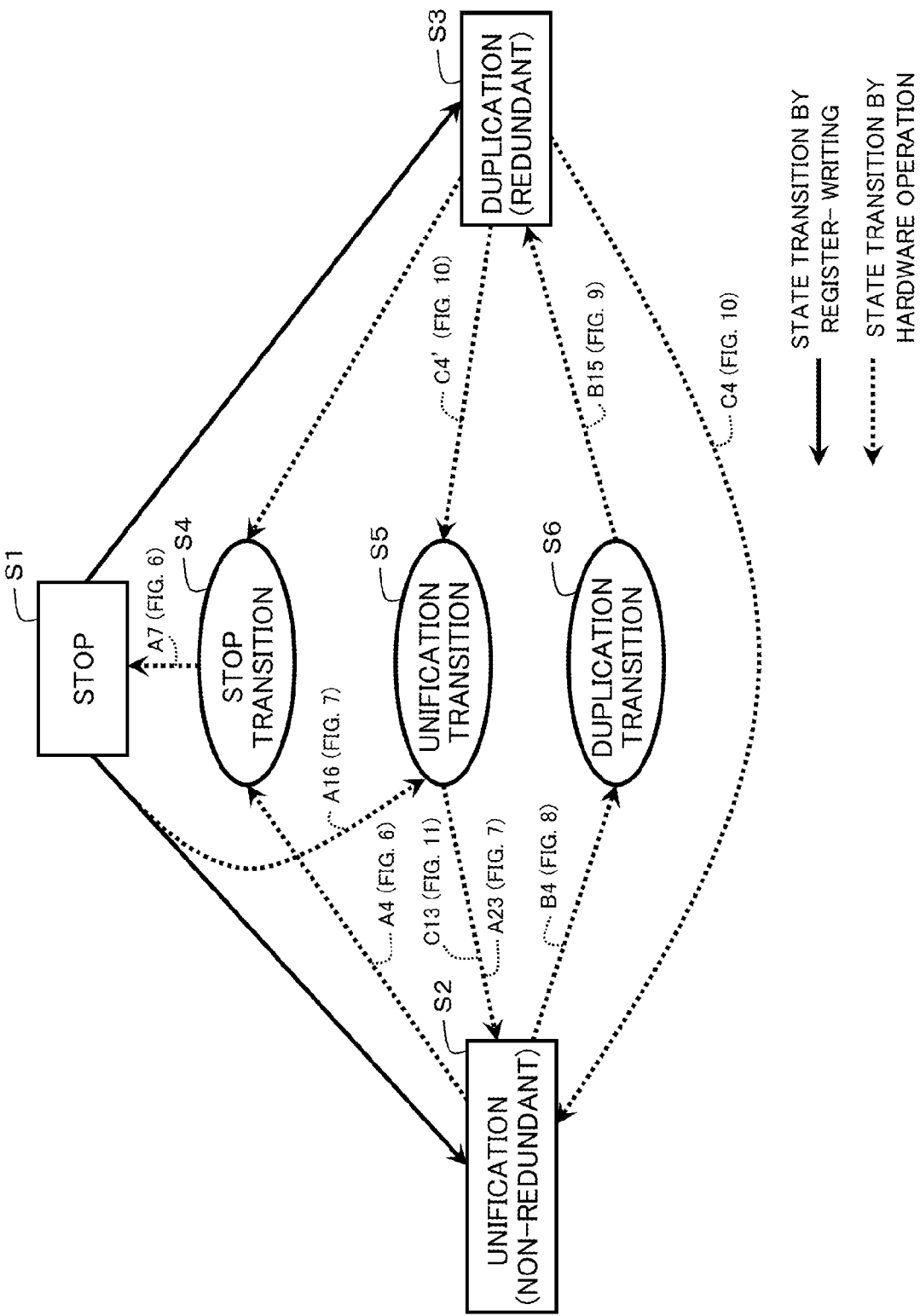
FIG. 3 is a state transition view of a resister (second holding unit) in a processing apparatus/an input/output apparatus of the processing system illustrated in FIG. 1.

The register 13 sets and holds any one of the above-mentioned first to sixth information S1 to S6 in every crossbar 30 which is connected to the processing apparatus 10, that is, in each of the crossbars 30-0 and 30-1 as configuration information of each of the crossbars 30, as illustrated in FIG. 3. Note that, FIG. 3 is a state transition view of the register 13 of each of the processing apparatuses 10 or a register 23 of each of the input/output apparatuses 20 (for crossbar #0/for crossbar #1).

As illustrated in FIG. 3, in the register 13, the transition from the stopped state S1 into the unification state S2 or the duplication state S3 is performed by the register-writing of the PC 40. For example, when the system 1 starts up, the PC 40 is also connected to the register 30 so that the PC 40 rewrites the register 13 from the stopped state S1 to the unification state S2 or the duplication state S3 by the register-writing. In the meantime, other state transition than the transition from the stopped state S1 into the unification state S2 and the duplication state S3 is performed by a hardware operation, that is, the configuration change setting circuit 12, which will be described below.

When the receiving unit 11 receives a packet that issues the configuration change instruction from the crossbar 30, the configuration change setting circuit 12 sets configuration information in accordance with the configuration change instruction in the register 13. Further, the setting circuit 12 sets the configuration information in the register 13 based on the change completion notification from the configuration change instructing circuit 14, which will be described below, as appropriate. Specifically, the setting circuit 12 performs at least the following functions (31) to (37). Note that, here, a case when the crossbar 30-1 (crossbar #1) receives the register-writing of the PC 40 will be described.

(31) When the crossbars 30-0 and 30-1 are in the unification state S2 or the duplication state S3, if the receiving unit 11 receives a packet that issues the stop transition instruction from the crossbar 30-1, the setting circuit 12 sets the state of the crossbar 30-1 of the register 13 to the stop transition state S4 (see A3 and A4 of FIG. 6).

(32) When the crossbar 30-1 is in the stop transition state S4, if the configuration change instructing circuit 14, which will be described below, stops the unification transmission, the setting circuit 12 sets the state of the crossbar 30-1 of the register 13 to the stopped state S1 (see A7 of FIG. 6).

(33) When the crossbar 30-1 is in the stopped state S1, if the receiving unit 11 receives a packet that issues the unification transition instruction from the crossbar 30-1, the setting circuit 12 sets the state of the crossbar 30-1 of the register 13 to the unification transition state S5 (see A15 and A16 of FIG. 7).

(34) When the crossbar 30-1 is in the unification transition state S5, if the receiving unit 11 receives a packet that permits the unification transmission from the crossbar 30-1, the setting circuit 12 sets the state of the crossbar 30-1 of the register 13 to the unification state S2 (see A22 and A23 of FIG. 7 and C12 and C13 of FIG. 11).

(35) When all of the crossbars 30-0 and 30-1 are in the unification state S2, if the receiving unit 11 receives a packet that issues the duplication transition instruction from the crossbar 30-1, the setting circuit 12 sets all the states of the crossbars 30-0 and 30-1 of the register 13 to the duplication transition state S6 (see B3 and B4 of FIG. 8).

(36) When all of the crossbars 30-0 and 30-1 are in the duplication transition state S6, if the receiving unit 11 receives a packet that permits the duplication transmission from the crossbars 30-0 and 30-1, the setting circuit 12 sets all the states of the crossbars 30-0 and 30-1 of the register 13 to the duplication state S3 (see B14 and B15 of FIG. 9).

(37) When all of the crossbars 30-0 and 30-1 are in the duplication state S3, if the receiving unit 11 receives a packet that issues the unification transition instruction from the crossbar 30-1, the setting circuit 12 sets the state of the crossbar 30-0 of the register 13 to the unification state S2 and simultaneously sets the state of the crossbar 30-1 of the register 13 to the unification transition state S5 (see C3, C4, and C4' of FIG. 10).

If the setting circuit 12 sets the configuration information in the register 13, the configuration change instructing circuit 14 instructs the operation change of the processing apparatus 10 corresponding to the configuration change of the crossbar 30. Specifically, the instructing circuit 14 performs at least the following functions (41) to (46). Note that, here, a case when the crossbar 30-1 (crossbar #1) receives the register-writing of the PC 40 will be described.

(41) When the crossbar 30-0 is in the unification state S2, if the state of the crossbar 30-1 of the register 13 is rewritten from the unification state S2 to the stop transition state S4, the instructing circuit 14 issues an instruction to stop the unification transmission to the crossbar 30-1 (see A5 of FIG. 6).

(42) When the crossbar 30-0 is in the unification state S2, if the state of the crossbar 30-1 of the register 13 is rewritten from the stopped state S1 to the unification transition state S5, the instructing circuit 14 issues an instruction to prepare the unification transmission to the crossbar 30-1 (see A17 of FIG. 7).

(43) When the crossbar 30-0 is in the unification state S2, if the state of the crossbar 30-1 of the register 13 is rewritten from the unification transition state S5 to the unification state S2, the instructing circuit 14 issues an instruction to start the unification transmission to a request system bus of the crossbars 30-0 and 30-1 (see A24 of FIG. 7 and C14 of FIG. 11).

(44) If the states of the crossbars 30-0 and 30-1 of the register 13 are rewritten from the unification state S2 to the duplication transition state S6, the instructing circuit 14 issues the instructions to stop the unification transmission to the crossbars 30-0 and 30-1 and prepare the duplication transmission (see B5 and B6 of FIG. 8).

(45) If the states of the crossbars 30-0 and 30-1 of the register 13 are rewritten from the duplication transition state S6 to the duplication state S3, the instructing circuit 14 issues the instruction to start the duplication transmission to the request system bus of the crossbars 30-0 and 30-1 (see B16 of FIG. 9).

(46) If the state of the crossbar 30-0 of the register 13 is rewritten from the duplication state S3 to the unification state S2 and the state of the crossbar 30-1 of the register 13 is rewritten from the duplication state S3 to the unification transition state S5, the instructing circuit 14 issues instructions to stop the duplication transmission to the crossbar 30-1 and prepare the unification transmission to the crossbar 30-1 (see C5' and C6' of FIG. 10).

If the processing apparatus 10 changes the operation, the configuration change completion packet generating circuit (an example of notifying unit) 15 (hereinafter, also simply referred to as a "generating circuit 15") generates a packet that issues the operation change completion notification and the transmitting unit 16 performs the packet to the crossbar 30 which is connected to the processing apparatus 10. In other words, when any one of the stop transition state S4, the unification transition state S5, and the duplication transition state S6, that is, any configuration change instruction is written in the register 13, the generating circuit 15 generates a packet that reports the completion of the instructed configuration change. Specifically, the generating circuit 15 performs at least the following functions (51) to (55). Note that, here, a case when the crossbar 30-1 (crossbar #1) receives the register-writing of the PC 40 will be described.

(51) If the unification transmission is stopped, the generating circuit 15 generates a packet that issues a notification indicating that the unification transmission is stopped and the transmitting unit 16 transmits the packet to the crossbar 30-1 (see A6 of FIG. 6).

(52) If the unification transmission is prepared, the generating circuit 15 generates a packet that issues a notification indicating that the unification transmission is prepared and the transmitting unit 16 transmits the packet to the crossbar 30-1 (see A18 of FIG. 7).

(53) If the unification transmission is stopped and the duplication transmission is prepared, the generating circuit 15 generates a packet that issues a notification indicating that the unification transmission is stopped and the duplication transmission is prepared and the transmitting unit 16 transmits the packet to the crossbars 30-0 and 30-1 (see B7 of FIG. 8).

(54) If the state of the crossbar 30-0 of the register 13 is rewritten from the duplication state S3 to the unification state S2 (see C4 of FIG. 10), the generating circuit 15 generates a packet that issues the unification instruction and the transmitting unit 16 transmits the packet to the crossbar 30-0 (see C5 of FIG. 10).

(55) After the state of the crossbar 30-1 of the register 13 is rewritten from the duplication state S3 to the unification transition state S5 (see C4' of FIG. 10), if the duplication transmission is stopped and the unification transmission is prepared, the generating circuit 15 generates a packet that issues a notification indicating that the duplication transmission is stopped and the unification transmission is prepared and the transmitting unit 16 transmits the packet to the crossbar 30-1 (see C7' of FIG. 10).

Note that, the receiving unit 21, the configuration change setting circuit 22, the register 23, the configuration change instructing circuit 24, the configuration change completion packet generating circuit 25, and the transmitting unit 26 which are included in each of the input/output apparatuses 20 have the same functions as the receiving unit 11, the configuration change setting circuit 12, the register 13, the configuration change instructing circuit 14, the configuration change completion packet generating circuit 15, and the transmitting unit 16 which are included in each of the processing apparatuses 10, respectively. The difference of the components 21 to 26 in each of the input/output apparatuses 20 from the components 11 to 16 in each of the processing apparatuses 10 is only in that the components 21 to 26 are provided in the input/output apparatus 20 rather than the processing apparatus 10. Therefore, the description of the components 21 to 26 will be omitted.

Figure 4:
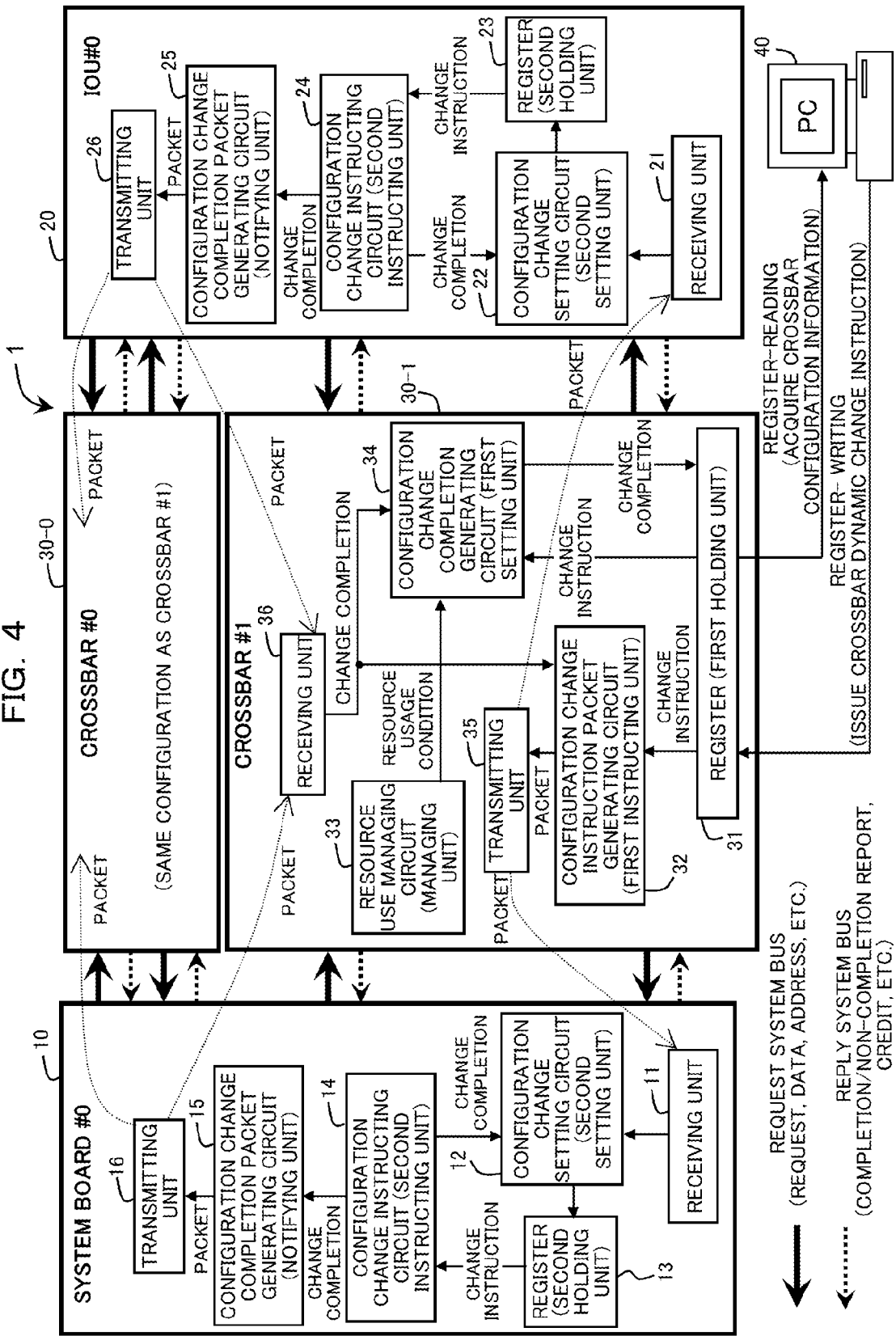
FIG. 4 is a block diagram explaining an operation of the processing system illustrated in FIG. 1.
Figure 12:
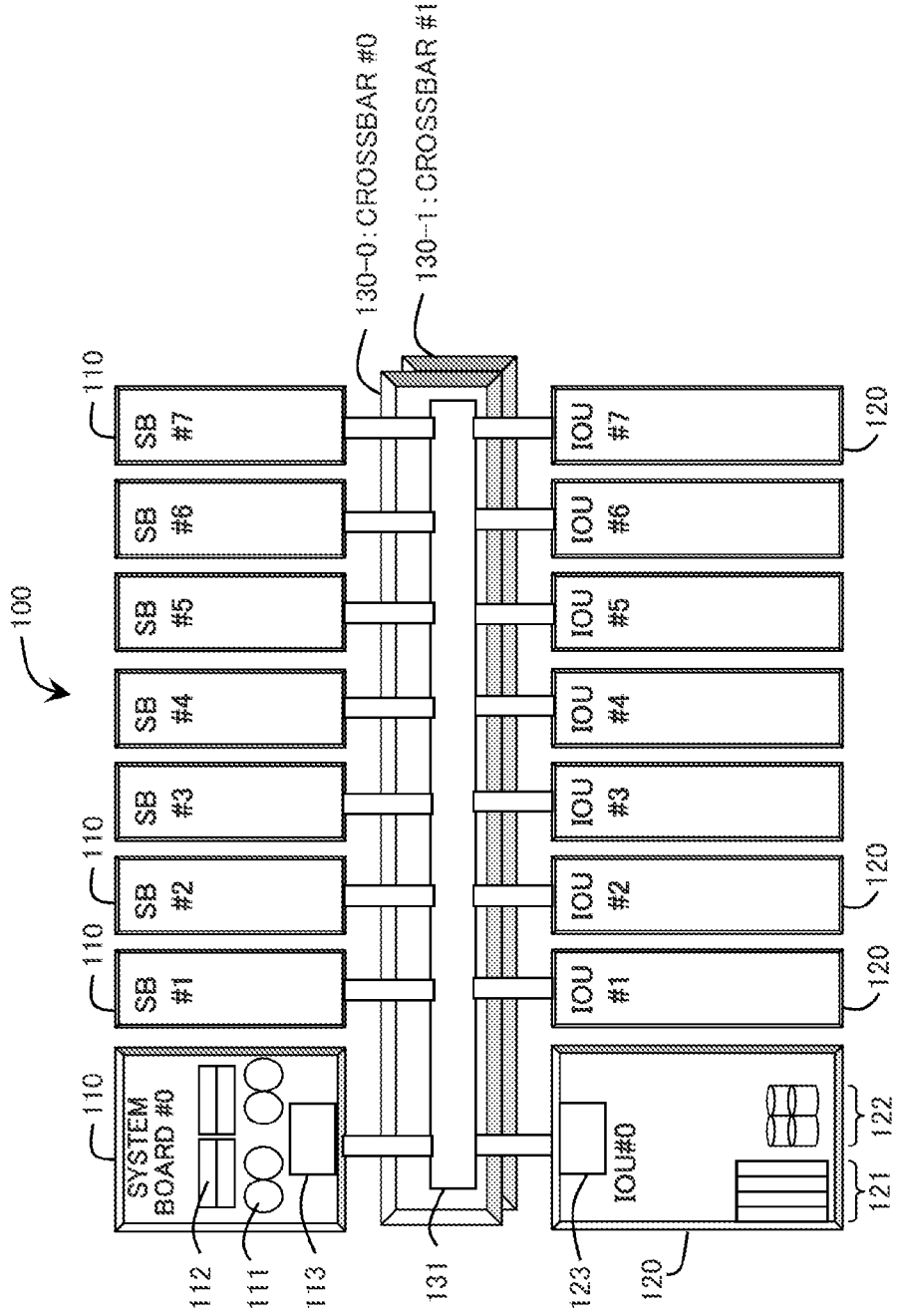
FIG. 12 is a block diagram illustrating a configuration of a usual computer system.
Figure 13:
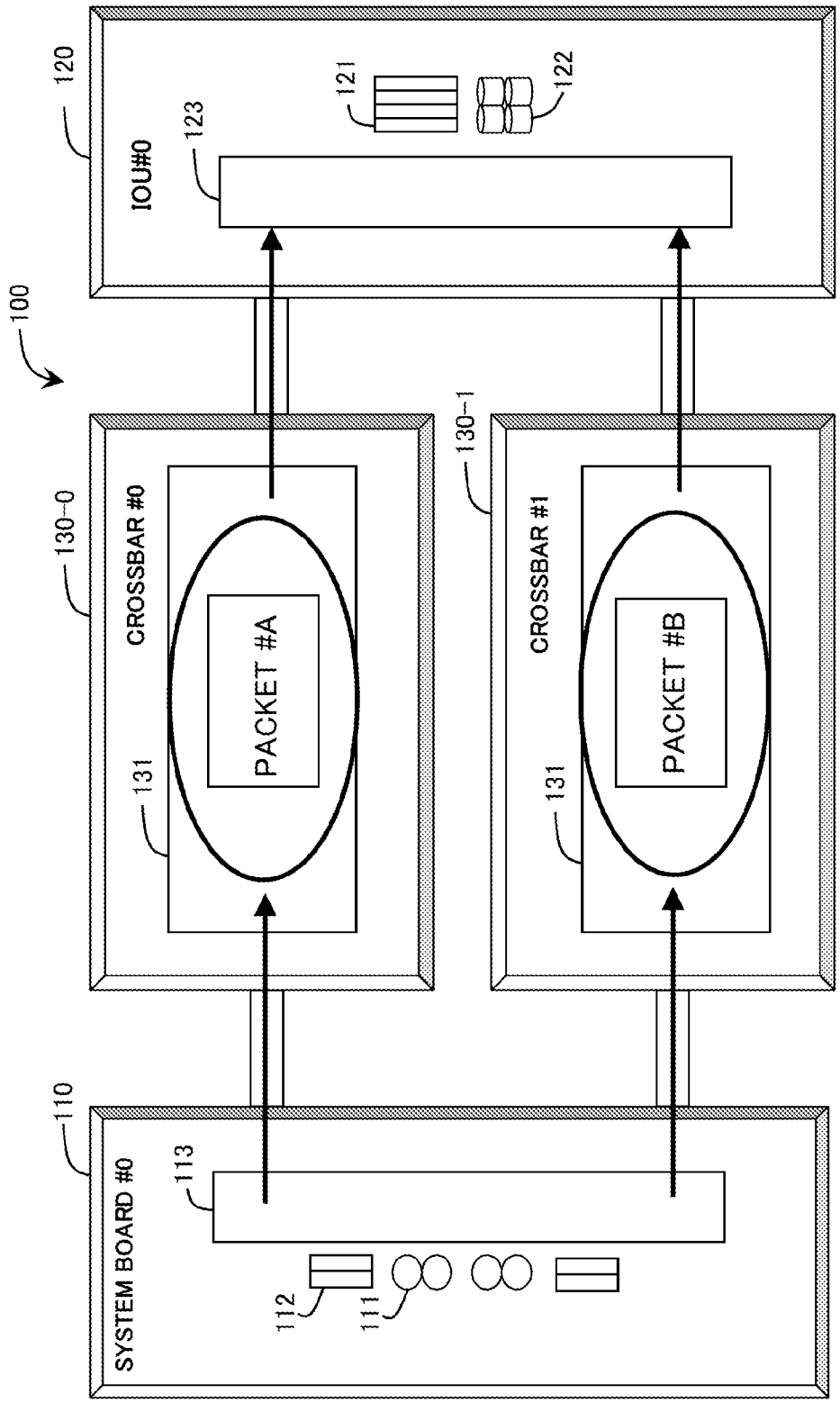
FIG. 13 is a view explaining a non-redundant state (unification state) of the crossbar of the system illustrated in FIG. 12.
Figure 14:
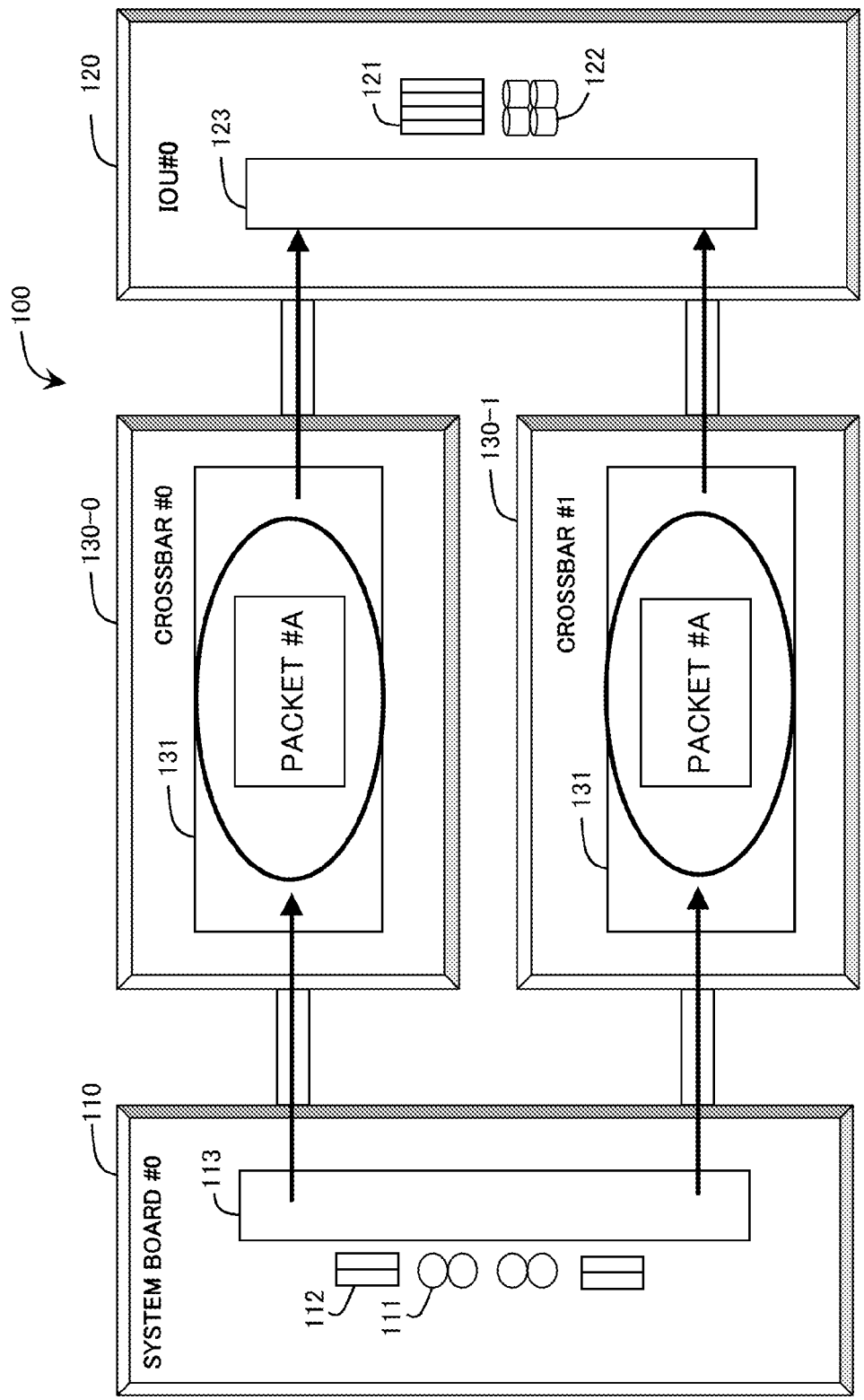
FIG. 14 is a view explaining a redundant state (duplication state) of the crossbar of the system illustrated in FIG. 12.
Figure 15:
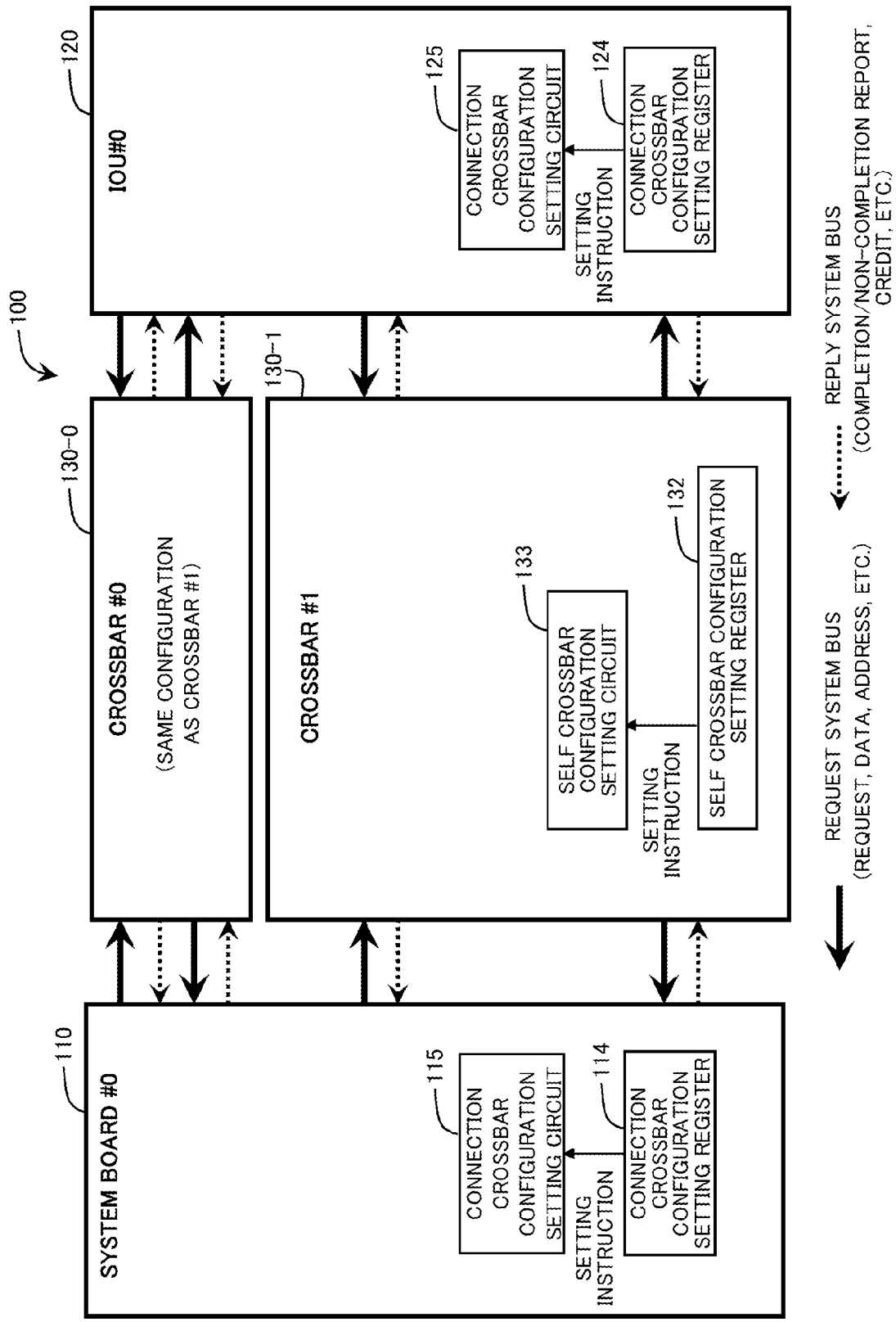
FIG. 15 is a block diagram illustrating a configuration of the related art to set the usage state of the crossbar.

Further, in FIGS. 1 and 4, one processing apparatus 10 and one input/output apparatus 20 are illustrated. However, as illustrated in FIG. 12, two or more processing apparatuses 10 and two or more input/output apparatuses 20 may be provided. In this case, all of the processing apparatuses 10 and all of the input/output apparatuses 20 are configured similarly to the processing apparatus 10 (system board #0) and the input/output apparatus 20 (IOU #0) described above with reference to FIG. 1 in detail. Similarly, even though two crossbars 30 are illustrated in FIGS. 1 and 4, three or more crossbars (communication apparatuses) 30 may be provided. Also in this case, all crossbars 30 are configured similarly to the crossbar 30 (crossbars #0 and #1) described above with reference to FIG. 1.

[2] Operation of Processing System

Next, the operation of the processing system 1 configured as described above will be described with reference to FIGS. 2 to 11.

[2-1] Dynamic Exchange Procedure of Unification Crossbar

First, referring to FIGS. 2 to 7, a procedure of dynamically exchanging one crossbar 30-1 during the operation of the processing system 1 when two crossbars 30-0 and 30-1 are in the unification state S2 will be described.

Figure 5:
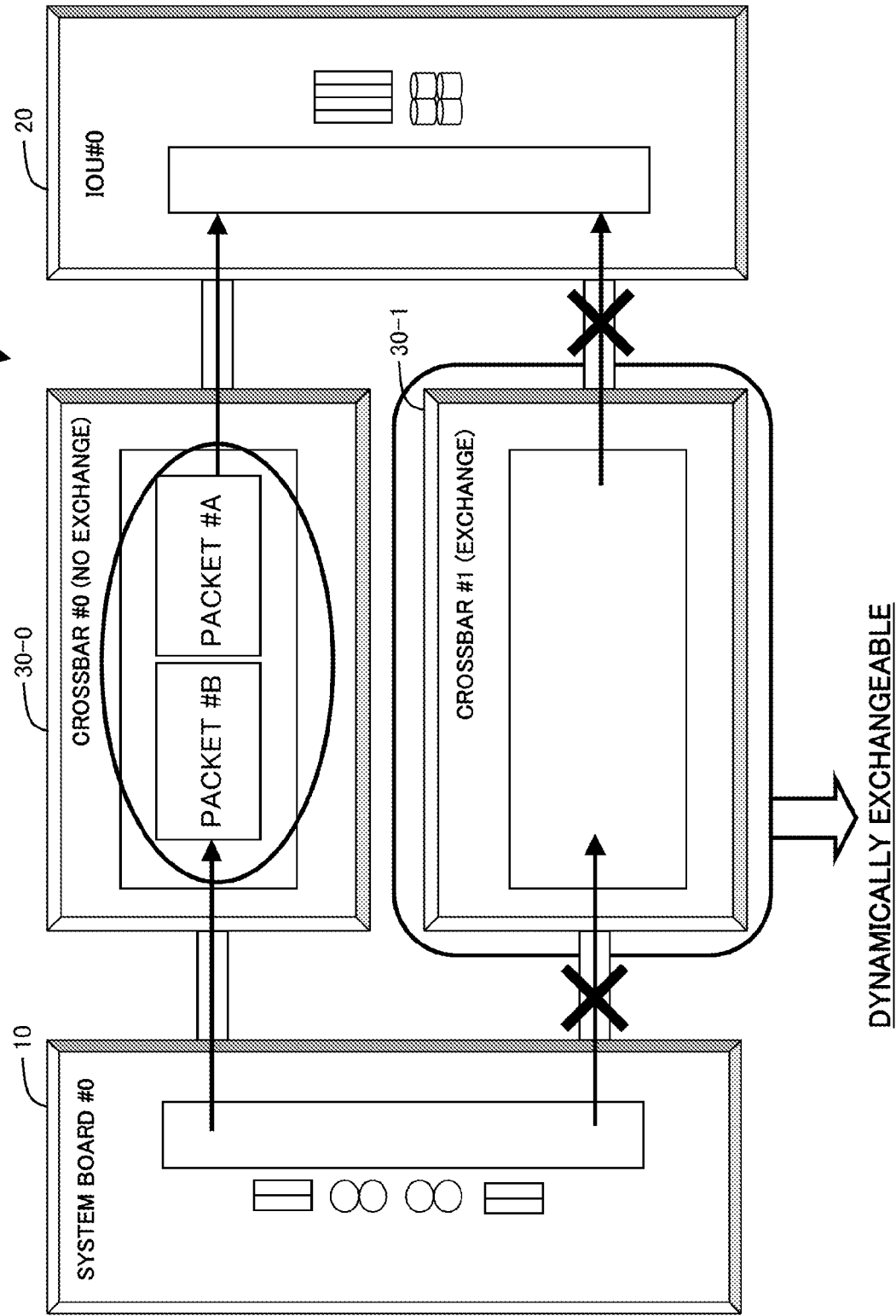
FIG. 5 is a view schematically explaining a dynamic exchange procedure of a unification crossbar in the processing system illustrated in FIGS. 1 and 4.

Note that, FIG. 4 is a block diagram explaining an operation of the processing system 1 and FIG. 5 is a view schematically explaining a dynamic exchange procedure of the unification crossbar in the processing system 1. In addition, FIGS. 6 and 7 are sequential views illustrating dynamic exchange procedures A1 to A25 of the unification crossbar in the processing system 1 in which FIG. 6 illustrates deleting procedures A1 to A11 of the crossbar 30-1 and FIG. 7 illustrates adding procedures A12 to A25 of a new crossbar 30-1.

When one of two of the same type of crossbars 30 which operate in the unification state S2 is dynamically exchanged, as illustrated in FIG. 5, a crossbar 30-0 which will not be exchanged between the two crossbars 30 in the unification state S2 maintains the unification state and the operation of the processing system 1 is continued. In the meantime, the crossbar 30-1 to be exchanged is transited into an unused state, that is, the stopped state S1. In this state, the crossbar 30-1 to be exchanged is stopped and exchanged with a new crossbar 30-1. Specifically, while continuing the operation by the crossbar 30-0 which will not be exchanged, the packet is not temporally transmitted to the crossbar 30-1 to be exchanged so that the crossbar 30-1 may be dynamically exchanged.

Hereinafter, dynamic exchanging procedures A1 to A25 of the crossbar 30-1 will be described in detail with reference to FIGS. 2 to 4, 6, and 7.

First, by the procedures A1 to A11, the processing system 1 is controlled so as to stop outputting a packet which is output from the processing apparatus 10 or the input/output apparatus 20 to the two crossbars 30 to the crossbar 30-1 to be exchanged and output the packet only to the crossbar 30-0 which will not be exchanged.

When the two crossbars 30-0 and 30-1 operate in the unification state S2, the register 31 of each of the crossbars 30, the register 13 of the processing apparatus 10, and the register 23 of the input/output apparatus 20 are set in the unification state S2.

[Procedure A1] In this state, when the crossbar 30-1 is dynamically exchanged, the PC 40 rewrites the state of the register 31 of the crossbar 30-1 from the unification state S2 to the stop transition state S4 by the register-writing (see A1 of FIG. 6, FIG. 2, and FIG. 4).

[Procedure A2] In the crossbar 30-1, if the stop transition state S4 is set in the register 31, the generating circuit 32 generates a packet that issues the stop transition instruction and the transmitting unit 35 transmits the packet that issues the stop transition instruction to the processing apparatus 10 and the input/output apparatus 20 which are connected to the crossbar 30-1 (see A2 of FIG. 6 and FIG. 4). By doing this, the stop transition instruction (instruction of configuration change in accordance with the stop transition state S4) is issued to all processing apparatuses 10 and all input/output apparatuses 20 which are connected to the crossbar 30-1 from the crossbar 30-1.

[Procedure A3] In all processing apparatuses 10 and all input/output apparatuses 20 which are connected to the crossbar 30-1, if the receiving unit 11 receives the packet that issues the stop transition instruction from the crossbar 30-1 (see A3 of FIG. 6 and FIG. 4), the following procedures A4 to A7 are performed.

[Procedure A4] The setting circuit 12 rewrites the state of the crossbar 30-1 of the register 13 from the unification state S2 to the stop transition state S4 (see A4 of FIG. 6, FIGS. 3 and 4).

[Procedure A5] If the state of the crossbar 30-1 of the register 13 is rewritten to the stop transition state S4, the instructing circuit 14 instructs to stop the unification transmission to the request system bus (request, data, address, etc.) of the crossbar 30-1 (see A5 of FIG. 6 and FIG. 4).

[Procedure A6] If the instructing circuit 14 stops the unification transmission, the generating circuit 15 generates a unification transmission stop completion packet and the transmitting unit 16 transmits the unification transmission stop completion packet to the crossbar 30-1 (see A6 of FIG. 6 and FIG. 4).

[Procedure A7] When the instructing circuit 14 stops the unification transmission, the setting circuit 12 that receives the change completion notification from the instructing circuit 14 rewrites the state of the crossbar 30-1 of the register 13 from the stop transition state S4 to the stopped state S1 (see A7 of FIG. 6, FIGS. 3 and 4).

[Procedure A8] In the crossbar 30-1 to be exchanged, if the receiving unit 36 receives the unification transmission stop completion packet from all processing apparatuses 10 and all input/output apparatuses 20 which are connected to the crossbar 30 (see A8 of FIG. 6 and FIG. 4), the following procedures A9 to A11 are performed.

[Procedure A9] After receiving the unification transmission stop completion packet, the generating circuit 34 allows the managing circuit 33 to check that all resources of the crossbar 30 are in an unused state (see A9 of FIG. 6 and FIG. 4).

[Procedure A10] If it is checked that all resources of the crossbar 30-1 are in the unused state, it is determined that the crossbar 30-1 is in a stoppable state so that the generating circuit 34 rewrites the state of the register 31 from the stop transition state S4 to the stopped state S1 (see A10 of FIG. 6, FIGS. 2 and 4).

[Procedure A11] When all resources of the crossbar 30 are in the unused state, the processing system 1 is in the state as illustrated in FIG. 5 so as to be in a state in which the crossbar 30-1 can be dynamically exchanged. The PC 40 polls the register 31 of the crossbar 30-1 and obtains the stopped state S5 after obtaining the stop transition state S4 from the register 31 by the register-reading. If the PC 40 obtains the stopped state S5 from the register 31, the operator performs the stop operation of the crossbar 30-1 and removes the crossbar 30-1.

[Procedure A12] After deleting the crossbar 30-1 to be exchanged, if a new crossbar 30-1 is mounted by the operator (see A12 of FIG. 7), the following procedures A13 and A14 are performed on the new crossbar 30-1.

[Procedure A13] Since the stopped state S1 is initially set in a register 31 of the new crossbar 30-1, if the new crossbar 30-1 is mounted, first, the PC 40 rewrites the state of the register 31 of the new crossbar 30-1 from the stopped state S1 to the unification state S5 by the register-writing (see A13 of FIG. 6, FIGS. 2 and 4).

[Procedure A14] In the new crossbar 30-1, if the unification transition state S5 is set in the register 31, the generating circuit 32 generates a packet that issues the unification transition instruction and the transmitting unit 35 transmits the packet that issues the unification transition instruction to the processing apparatus 10 and the input/output apparatus 20 which are connected to the new crossbar 30-1 (see A14 of FIG. 7 and FIG. 4). By doing this, the unification transition instruction (instruction of configuration change in accordance with the unification transition state S5) is issued to all processing apparatuses 10 and all input/output apparatuses 20 which are connected to the crossbar 30-1 from the new crossbar 30-1.

[Procedure A15] In all processing apparatuses 10 and all input/output apparatuses 20 which are connected to the new crossbar 30-1, if the receiving unit 11 receives the packet that issues the unification transition instruction from the new crossbar 30-1 (see A15 of FIG. 7 and FIG. 4), the following procedures A16 to A18 are performed.

[Procedure A16] The setting circuit 12 rewrites the state of the crossbar 30-1 of the register 13 from the stop state S1 to the unification transition state S5 (see A16 of FIG. 7, FIGS. 3 and 4).

[Procedure A17] If the state of the crossbar 30-1 of the register 13 is rewritten to the unification transition state S5, the instructing circuit 14 instructs to prepare the unification transmission to the crossbar 30-1 (see A17 of FIG. 7 and FIG. 4). As the preparation of the unification transmission, in the processing apparatus 10 and the input/output apparatus 20, the unification of a bus which will be connected to the crossbar 30-1 is set. After setting the unification, the processing apparatus 10 and the input/output apparatus 20 are in a standby state to transmit a request.

[Procedure A18] If the instructing circuit 14 prepares the unification transmission, the generating circuit 15 generates a preparation completion packet of the unification transmission and the transmitting unit 16 transmits the preparation completion packet of the unification transmission to the new crossbar 30-1 (see A18 of FIG. 7 and FIG. 4).

[Procedure A19] In the new crossbar 30-1, if the receiving unit 36 receives the preparation completion packet of the unification transmission from all processing apparatuses 10 and all input/output apparatuses 20 which are connected to the crossbar 30 (see A19 of FIG. 7 and FIG. 4), the following procedures A20 and A21 are performed.

[Procedure A20] After receiving the preparation completion packet of the unification transmission, the generating circuit 32 generates a packet that issues the unification transmission permission and the transmitting unit 35 transmits the packet that issues the unification transmission permission to all processing apparatuses 10 and all the input/output apparatuses 20 which are connected to the new crossbar 30-1 (see A20 of FIG. 7 and FIG. 4).

[Procedure A21] After receiving the preparation completion packet of the unification transmission, the generating circuit 34 rewrites the state of the register 31 from the unification transition state S5 to the unification state S2 (see A21 of FIG. 7 and FIGS. 2 and 4).

[Procedure A22] In the processing apparatus 10 and the input/output apparatus 20 which are connected to the new crossbar 30-1, if the receiving unit 11 receives the packet that issues the unification transmission permission from the new crossbar 30-1 (see A22 of FIG. 7 and FIG. 4), the following procedures A23 and A24 are performed.

[Procedure A23] The setting circuit 12 rewrites the state of the crossbar 30-1 of the register 13 from the unification transition state S5 to the unification state S2 (see A23 of FIG. 7, FIGS. 3 and 4).

[Procedure A24] If the state of the crossbar 30-1 of the register 13 is rewritten from the unification transition state S5 to the unification state S2, the instructing circuit 14 instructs to start the unification transmission to the request system bus (request, data, address, etc.) of the crossbars 30-0 and 30-1 (see A24 of FIG. 7 and FIG. 4).

[Procedure A25] Accompanied with the completion of the procedure A24, the new crossbar 30-1 starts the unification operation.

As described above, in the processing system 1 of the embodiment, while continuing the operation by the crossbar 30-0 which will not be exchanged, the crossbar 30-1 to be exchanged is transited in a state in which the packet is not temporally transmitted to the crossbar 30-1 to dynamically exchange the crossbar 30-1. By doing this, the crossbar 30 is dynamically and easily exchanged without stopping the operation of the processing system 1.

[2-2] Dynamic Duplication Procedure of Unification Crossbar

By applying the above-described dynamic exchange procedure of the unification crossbar, the dynamic duplication of the unification crossbar or the dynamic unification of the duplication crossbar is available as described below. The main difference of the dynamic exchange of the unification crossbar from the dynamic duplication of the unification crossbar or the dynamic unification of the duplication crossbar is as follows.

Difference between the dynamic exchange of the unification crossbar and the dynamic duplication of the unification crossbar: In the dynamic exchange of the unification crossbar, the operation of the crossbar 30-0 which will not be exchanged is continued. In contrast, in the dynamic duplication of the unification crossbar, operations of all crossbars are stopped even during a very short time.

Difference between the dynamic exchange of the unification crossbar and the dynamic unification of the duplication crossbar: In the dynamic exchange of the unification crossbar, switching over of the stop/start of the unification is performed on the crossbar 30-1 before and after being exchanged. In contrast, in the dynamic unification of the duplication crossbar, in addition to the switching over of the stop/start, switching over of the duplication/unification is performed. Further, the state of the register 31 in the crossbar 30 which will not be exchanged is also changed (duplication→unification).

In this section, a procedure of changing the crossbars 30-0 and 30-1 from the unification state S2 to the duplication state S3 when the two crossbars 30-0 and 30-1 are in the unification state S2 will be described in detail with reference to FIGS. 2 to 4, 8, and 9.

Note that, FIGS. 8 and 9 are sequential views illustrating the dynamic duplication procedures B1 to B17 of the unification crossbar in the processing system 1, in which FIG. 8 illustrates the procedures B1 to B10 from the unification state S2 to the stopped state S1 and FIG. 9 illustrates the procedures B11 to B17 from the stopped state to the duplication state.

At the time of dynamic duplication of the unification crossbar, first, the packet transmission to two crossbars 30 in the unification state is temporally stopped by the procedures B1 to B10. However, a system operation such as a power supplying operation is continued. After switching from the unification to the duplication by the procedures B11 to B17, the same packet starts to be transmitted to the two crossbars 30. Here, the reason of temporally stopping the packet transmission to the two crossbars 30 is to synchronize the operations of the two crossbars 30 at the time of starting the duplication transmission. In this case, even though the packet transmission from the processing apparatus 10 or the input/output apparatus 20 to the crossbar 30 is temporally stopped, the stop process or the switching process after being stopped is performed by a hardware in the processing system 1. Therefore, the stopped time is very short. As a result, the dynamic duplication of the unification crossbar is performed without actually stopping the operation of the processing system 1.

When the two crossbars 30-0 and 30-1 operate in the unification state S2, the register 31 of each of the crossbars 30, the register 13 of the processing apparatus 10, and the register 23 of the input/output apparatus 20 are set in the unification state S2. Note that, in the embodiment, there are two crossbars 30 which are desired to be switched from the unification state S2 to the duplication state S3. However, only by performing the register-writing of the PC 40 on one of the crossbars 30-1, the dynamic duplication of the unification crossbar is performed.

[Procedure B1] When the crossbars 30-0 and 30-1 are changed from the unification state S2 to the duplication state S3, the PC 40 rewrites the state of the register 31 of the crossbar 30-1 from the unification state S2 to the duplication transition state S6 by the register-writing (see B1 of FIG. 8, FIGS. 2 and 4).

[Procedure B2] If the duplication transition state S6 is set in the register 31 of the crossbar 30-1, the generating circuit 32 generates a packet that issues the duplication transition instruction and the transmitting unit 35 transmits the packet that issues the duplication transition instruction to the processing apparatus 10 and the input/output apparatus 20 which are connected to the crossbar 30-1 (see B2 of FIG. 8 and FIG. 4). By doing this, the duplication transition instruction (instruction of configuration change in accordance with the duplication transition state S6) is issued to all processing apparatuses 10 and all input/output apparatuses 20 which are connected to the crossbar 30 from the crossbar 30-1.

[Procedure B3] In all processing apparatuses 10 and all input/output apparatuses 20 which are connected to the crossbar 30, if the receiving unit 11 receives the packet that issues the duplication transition instruction from the crossbar 30-1 (see B3 of FIG. 8 and FIG. 4), the following procedures B4 to B7 are performed.

[Procedure B4] The setting circuit 12 rewrites all the states of the crossbars 30-0 and 30-1 of the register 13 from the unification state S2 to the duplication transition state S6 (see B4 of FIG. 8, FIGS. 3 and 4).

[Procedure B5] If the state of the crossbar 30-1 of the register 13 is rewritten to the duplication transition state S6, the instructing circuit 14 instructs to stop the unification transmission to the request system bus (request, data, address, etc.) of the crossbars 30-0 and 30-1 (see B5 of FIG. 8 and FIG. 4).

[Procedure B6] After stopping the unification transmission, the instructing circuit 14 instructs to prepare the duplication transmission to the crossbars 30-0 and 30-1 (see B6 of FIG. 8 and FIG. 4). As the preparation of the duplication transmission, in the processing apparatus 10 and the input/output apparatus 20, the duplication of a bus which will be connected to the crossbars 30-0 and 30-1 is set. After setting the duplication, the processing apparatus 10 and the input/output apparatus 20 are in a standby state to transmit a request.

[Procedure B7] If the instructing circuit 14 stops the unification transmission and prepares the duplication transmission, the generating circuit 15 generates a packet that issues a notification indicating that the unification transmission is stopped and the duplication transmission is prepared and the transmitting unit 16 transmits the generated packet to the crossbars 30-0 and 30-1 (see B7 of FIG. 8 and FIG. 4).

[Procedure B8] In a crossbar 30-0 which is not connected to the PC 40, if the receiving unit 36 receives a packet that issues the completion notification of the unification transmission stop and duplication transmission preparation from any one of the processing apparatus 10 and the input/output apparatus 20 which are connected to the crossbar 30-0 (see B8 of FIG. 8 and FIG. 4), the following procedures B9 and B10 are performed.

[Procedure B9] The generating circuit 34 rewrites all the states of the register 31 from the unification state S2 to the duplication transition state S6 (see B9 of FIG. 8, FIGS. 2 and 4).

[Procedure B10] In the crossbars 30-0 and 30-1, if the receiving unit 36 receives the packet that issues the completion notifications of the unification transmission stop and duplication transmission preparation from all processing apparatuses 10 and all input/output apparatuses 20 which are connected to the crossbar 30 (see B10 of FIG. 8 and FIG. 4), the following procedures B11 to B13 are performed.

[Procedure B11] After receiving the packet that issues the completion notifications of the unification transmission stop and duplication transmission preparation, the generating circuit 34 allows the managing circuit 33 to check that all resources of each of the crossbars 30 are in an unused state (see B11 of FIG. 9 and FIG. 4).

[Procedure B12] If it is checked that all resources of each of the crossbars 30 are in the unused state, it is determined that each of the crossbars 30 is in a duplication operable state so that the generating circuit 32 generates a packet that issues the duplication transmission permission and the transmitting unit 35 transmits the packet that issues the duplication transmission permission to the processing apparatus 10 and the input/output apparatus 20 which are connected to each of the crossbars 30 (see B12 of FIG. 9 and FIG. 4).

[Procedure B13] Similarly, if it is checked that all resources of each of the crossbars 30 are in the unused state, it is determined that each of the crossbars 30 is in a duplication operable state so that the generating circuit 34 rewrites the state of the register 31 from the duplication transition state S6 to the duplication state S3 (see B13 of FIG. 9, FIGS. 2 and 4).

[Procedure B14] In the processing apparatus 10 and the input/output apparatus 20 which are connected to the crossbars 30-0 and 30-1, if the receiving unit 11 receives the packet that issues the duplication transmission permission from the crossbars 30-0 and 30-1, the following procedures B15 and B16 are performed.

[Procedure B15] The setting circuit 12 rewrites all the states of the crossbars 30-0 and 30-1 of the register 13 from the duplication transition state S6 to the duplication state S3 (see B15 of FIG. 9, FIGS. 3 and 4).

[Procedure B16] If the states of the crossbars 30-0 and 30-1 of the register 13 are rewritten from the duplication transition state S6 to the duplication state S3, the instructing circuit 14 instructs to start the duplication transmission to the request system bus (request, data, address, etc.) of the crossbars 30-0 and 30-1 (see B16 of FIG. 9 and FIG. 4).

[Procedure B17] Accompanied with the completion of the procedure B16, the crossbars 30-0 and 30-1 start the duplication operation.

As described above, in the processing system 1 of the embodiment, after temporally stopping the packet transmission to the two crossbars 30 in the unification state, the duplication transmission starts while synchronizing the operations of the two crossbars 30. By doing this, the dynamic duplication of the unification crossbar is dynamically and easily performed without actually stopping the operation of the processing system 1.

[2-3] Dynamic Unification Procedure of Duplication Crossbar

In this section, a procedure of changing the crossbars 30-0 and 30-1 from the duplication state S3 to the unification state S2 when the two crossbars 30-0 and 30-1 are in the duplication state S3 will be described in detail with reference to FIGS. 2 to 4, 10, and 11.

Note that, FIGS. 10 and 11 are sequential views illustrating the dynamic unification procedures C1 to C15 and C4' to C7' of the duplication crossbar in the processing system 1, in which FIG. 10 illustrates the procedures C1 to C8 and C4' to C7' from the duplication state S3 to a one-side unification state and FIG. 11 illustrates the procedures C9 to C15 from the one-side unification state to the both-side unification state.

At the time of dynamic unification of the duplication crossbar, in the embodiment, first, the packet transmission to the crossbar 30-1 is stopped while continuing the operation of the crossbar 30-0. However, a system operation such as a power supplying operation is continued. In this state, after changing the crossbars 30-0 and 30-1 from the duplication state S3 to the unification state S2, the unification transmission to the crossbar 30-1 in which the packet transmission is stopped starts. As a result, the dynamic unification of the duplication crossbar is performed without stopping the operation of the processing system 1.

When the two crossbars 30-0 and 30-1 operate in the duplication state S3, the register 31 of each of the crossbars 30, the register 13 of the processing apparatus 10, and the register 23 of the input/output apparatus 20 are set in the duplication state S3. Note that, in the embodiment, there are two crossbars 30 which are desired to be switched from the duplication state S3 to the unification state S2. However, only by performing the register-writing of the PC 40 on one of the crossbars 30-1, that is, the crossbar 30-1 in which the packet transmission is temporally stopped, the dynamic unification of the duplication crossbar is performed.

[Procedure C1] When the crossbars 30-0 and 30-1 are changed from the duplication state S3 to the unification state S2, the PC 40 rewrites the state of the register 31 of the crossbar 30-1 from the duplication state S3 to the unification transition state S5 by the register-writing (see C1 of FIG. 10, FIGS. 2 and 4).

[Procedure C2] If the unification transition state S5 is set in the register 31 of the crossbar 30-1, the generating circuit 32 generates a packet that issues the unification transition instruction and the transmitting unit 35 transmits the packet that issues the unification transition instruction to the processing apparatus 10 and the input/output apparatus 20 which are connected to the crossbar 30-1 (see C2 of FIG. 10 and FIG. 4). By doing this, the unification transition instruction (instruction of configuration change in accordance with the unification transition state S5) is issued to all processing apparatuses 10 and all input/output apparatuses 20 which are connected to the crossbar 30 from the crossbar 30-1.

[Procedure C3] In all processing apparatuses 10 and all input/output apparatuses 20 which are connected to the crossbar 30, if the receiving unit 11 receives the packet that issues the unification transition instruction from the crossbar 30-1 (see C3 of FIG. 10 and FIG. 4), the following procedures C4, C4', C5 and C5' to C7' are performed.

[Procedures C4 and C4'] The setting circuit 12 rewrites the state of the crossbar 30-0 of the register 13 from the duplication state S3 to the unification state S2 (see C4 of FIG. 10, FIGS. 3 and 4) and simultaneously rewrites the state of the crossbar 30-1 of the register 13 from the duplication state S3 to the unification transition state S5 (see C4' of FIG. 10, FIGS. 3 and 4).

[Procedure C5] If the state of the crossbar 30-0 of the register 13 is rewritten to the unification state S2, the generating circuit 15 generates a packet that issues the unification instruction and the transmitting unit 16 transmits the packet that issues the unification instruction to the crossbar 30-0 (see C5 of FIG. 10 and FIG. 4).

[Procedure C5'] If the state of the crossbar 30-1 of the register 13 is rewritten to the unification transition state S5, the instructing circuit 14 instructs to stop the duplication transmission to the request system bus (request, data, address, etc.) of the crossbar 30-1 (see C5' of FIG. 10 and FIG. 4).

[Procedure C6'] After stopping the duplication transmission, the instructing circuit 14 instructs to prepare the unification transmission to the crossbar 30-1 (see C6' of FIG. 10 and FIG. 4). As the preparation of the unification transmission, in the processing apparatus 10 and the input/output apparatus 20, the unification of a bus which will be connected to the crossbar 30-1 is set. After setting the unification, the processing apparatus 10 and the input/output apparatus 20 are in a standby state to transmit a request.

[Procedure C7'] If the instructing circuit 14 stops the duplication transmission and prepares the unification transmission, the generating circuit 15 generates a packet that issues a notification indicating that the duplication transmission is stopped and the unification transmission is prepared and the transmitting unit 16 transmits the packet to the crossbars 30-1 (see C7' of FIG. 10 and FIG. 4).

[Procedures C6 and C7] In a crossbar 30-0 which is not connected to the PC 40 but continues the operation, if the receiving unit 36 receives the packet that issues the unification instruction from the processing apparatus 10 and the input/output apparatus 20 which are connected to the crossbar 30-0 (see C6 of FIG. 10 and FIG. 4), the generating circuit 34 rewrites the state of the register 31 from the duplication state S3 to the unification state S2 (see C7 of FIG. 10, FIGS. 2 and 4).

[Procedure C8] In the crossbars 30-1, if the receiving unit 36 receives the packet that issues the completion notifications of the duplication transmission stop and unification transmission preparation from all processing apparatuses 10 and all input/output apparatuses 20 which are connected to the crossbar 30-1 (see C8 of FIG. 10 and FIG. 4), the following procedures C9 to C11 are performed.

[Procedure C9] After receiving the packet that issues the completion notification of the duplication transmission stop and unification transmission preparation, the generating circuit 34 allows the managing circuit 33 to check that all resources of the crossbar 30-1 are in an unused state (see C9 of FIG. 11 and FIG. 4).

[Procedure C10] If it is checked that all resources of the crossbar 30-1 are in the unused state, it is determined that the crossbar 30-1 is in a unification operable state so that the generating circuit 32 generates a packet that issues the unification transmission permission and the transmitting unit 35 transmits the packet that issues the unification transmission permission to the processing apparatus 10 and the input/output apparatus 20 which are connected to the crossbars 30-1 (see C10 of FIG. 11 and FIG. 4).

[Procedure C11] Similarly, if it is checked that all resources of the crossbar 30-1 are in the unused state, it is determined that each of the crossbars 30 is in a unification operable state so that the generating circuit 34 rewrites the state of the register 31 from the unification transition state S5 to the unification state S2 (see C11 of FIG. 11, FIGS. 2 and 4).

[Procedure C12] In the processing apparatus 10 and the input/output apparatus 20 which are connected to the crossbar 30-1, if the receiving unit 11 receives the packet that issues the unification transmission permission from the crossbar 30-1, the following procedures C13 and C14 are performed.

[Procedure C13] The setting circuit 12 rewrites the state of the crossbar 30-1 of the register 13 from the unification transition state S5 to the unification state S2 (see C13 of FIG. 11, FIGS. 3 and 4).

[Procedure C14] If the state of the crossbar 30-1 of the register 13 is rewritten from the unification transition state S5 to the unification state S2, the instructing circuit 14 instructs to start the unification transmission to the request system bus (request, data, address, etc.) of the crossbar 30-1 (see C14 of FIG. 11 and FIG. 4).

[Procedure C15] Accompanied with the completion of the procedure C14, the crossbar 30-1 starts the unification operation.

As described above, in the processing system 1 of the embodiment, an operation of only one crossbar 30-1 of the two crossbars 30 in the duplication state is stopped but an operation of the other crossbar 30-0 is continued. Further, the crossbar 30-1 is changed from the duplication state S3 to the unification state S2 to start the unification transmission. By doing this, the dynamic unification of the duplication crossbar is dynamically and easily performed without actually stopping the operation of the processing system 1.

[3] Effect of Processing System

As described above, the processing system 1 of the embodiment is configured to change the configuration of each of the crossbars 30 or the processing apparatus 10 and the input/output apparatus 20 which are connected to each of the crossbars 30 by setting the configuration information in the register 31 of one crossbar 30-1. In other words, in order to dynamically change the setting of the state which is set in the registers 13, 23, and 31, the above-mentioned various circuits 12, 22, 14, 24, 15, 25, and 33 to 35 are provided. By doing this, the exchange of the crossbar 30 in the unification state, the dynamic duplication of the unification crossbar, or the dynamic unification of the duplication crossbar may be dynamically and easily performed without stopping the operation of the system.

Therefore, when the crossbar 30 malfunctions, the unification crossbar may be exchanged without stopping the operation of the processing system 1, which significantly improves the maintainability.

Further, if it is desired to change the processing system 1 from the performance based system to the reliability based system, or from the reliability based system to the performance based system, the unification/duplication of the crossbar 30 may be switched without stopping the operation of the processing system 1, which significantly improves the flexibility for the strategy change.

[4] Others

While preferred embodiments have been described in detail above, the present invention is not limited to the specific embodiments but may be variously modified and changed to be embodied without departing from the gist of the present invention.

Note that, the processing system 1 includes one or more processing apparatuses 10 and one or more input/output apparatuses 20. However, the processing system 1 does not include the input/output apparatuses 20 but may include two or more processing apparatuses 10. The technology of the present invention is also applied to such a processing system 1 so that the same effects as the above-described embodiment may be achieved. Further, the numbers of processing apparatuses 10, input/output apparatuses 20, and crossbars 30 are not limited to the disclosure of the above-described embodiment. In the above-described embodiment, it is described that the communication apparatus is a crossbar switch. However, the type of the communication apparatus is not limited to the crossbar switch. In the embodiment, all of the processing apparatus/system board 10 and the input/output apparatus/IOU 20 are understood as "processing apparatuses".

Further, all or parts of functions as the configuration change setting circuits 12 and 22, the configuration change instructing circuits 14 and 24, the configuration change completion packet generating circuits 15 and 25, the configuration change instruction packet generating circuit 32, the resource use managing circuit 33, and the configuration change completion generating circuit 34 may be implemented by executing a predetermined application program by a computer (including a CPU, an information processing unit, and various terminals).

The program may be provided to be recorded in a computer readable recording medium such as a flexible disk, a CD (CD-ROM, CD-R, CD-RW, etc.), a DVD (DVD-ROM, DVD-RAM, DVD-R, DVD-RW, DVD+R, DVD+RW, etc.) or a Blu-ray disk. In this case, the computer reads out the program from the recording medium to transmit and store the program in an internal storage device or an external storage device to use the program.

Here, the computer is a concept that includes a hardware and an OS (operating system) and refers to a hardware that operates under the control of the OS. Further, if the OS is not used and the hardware is operated solely by an application program, the hardware itself corresponds to the computer. The hardware includes at least a microprocessor such as a CPU and a unit that reads a computer program recorded in a recording medium. The application program includes a program code that allows the above-mentioned computer to implement the functions of the circuits 12, 22, 14, 24, 15, 25, and 32 to 34. Further, a part of the functions may be implemented by an OS rather than the application program.

According to the embodiments, it is possible to dynamically and easily exchange the communication apparatuses and change the configuration without stopping the operation of the system.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A processing system, comprising:
   one or more processing apparatuses;
   one or more input/output apparatuses; and
   two or more communication apparatuses that connect the one or more processing apparatuses and the one or more input/output apparatuses to exchange data among the one or more processing apparatuses and the one or more input/output apparatuses,
   wherein each of the communication apparatuses includes:
   a first holding unit that holds configuration information of the communication apparatus, the configuration information being a usage state of the communication apparatus;
   a first instructing unit that, when the configuration information is set in the first holding unit, issues a configuration change instruction in accordance with the set configuration information to the one or more processing apparatuses and the one or more input/output apparatuses which are connected to the communication apparatus; and
   a first setting unit that, when an operation change completion notification corresponding to the configuration change instruction is received from the one or more processing apparatuses and the one or more input/output apparatuses connected to the communication apparatus, sets the configuration information in accordance with a state established after a configuration change by the configuration change instruction in the first holding unit;
   each of the one or more processing apparatuses and the one or more input/output apparatuses includes:
   a second holding unit that holds the configuration information of the communication apparatuses connected with the processing apparatus or the input/output apparatus, the configuration information being the usage states of the communication apparatuses;
   a second setting unit that, when the configuration change instruction is received from at least one of the connected communication apparatuses, sets the configuration information in accordance with the configuration change instruction in the second holding unit;
   a second instructing unit that, when the configuration information is set in the second holding unit, issues an operation change instruction corresponding to the configuration change to the processing apparatus or the input/output apparatus; and a notifying unit that, when the processing apparatus or the input/output apparatus completes an operation change by the operation change instruction, issues an operation change completion notification to at least one of the connected communication apparatuses, wherein each of the communication apparatuses further includes a managing unit that manages a usage condition of a resource in the communication apparatus, and the first setting unit sets, when the operation change completion notification corresponding to the configuration change is received from the one or more processing apparatuses and the one or more input/output apparatuses connected to the communication apparatus and when the managing unit checks that all resources in the communication apparatus are not used, the configuration information in accordance with a status established after the configuration change in the first holding unit.

2. The processing system according to claim 1, further comprising a configuration information setting unit that sets the configuration information of one of the communication apparatuses in the first holding unit of the communication apparatus.

3. A processing system, comprising:
one or more processing apparatuses;
one or more input/output apparatuses; and
two or more communication apparatuses that connect the one or more processing apparatuses and the one or more input/output apparatuses to exchange data among the one or more processing apparatuses and the one or more input/output apparatuses,
wherein each of the communication apparatuses includes:
a first holding unit that holds configuration information of the communication apparatus;
a first instructing unit that, when the configuration information is set in the first holding unit, issues a configuration change instruction in accordance with the set configuration information to the one or more processing apparatuses and the one or more input/output apparatuses which are connected to the communication apparatus;
a managing unit that manages a usage condition of a resource in the communication apparatus; and
a first setting unit that, when the operation change completion notification corresponding to the configuration change instruction is received from the one or more processing apparatuses and the one or more input/output apparatuses connected to the communication apparatus and when the managing unit checks that all resources in the communication apparatus are not used, sets the configuration information in accordance with a status established after a configuration change by the configuration change instruction in the first holding unit;
each of the one or more processing apparatuses and the one or more input/output apparatuses includes:
a second holding unit that holds the configuration information of the communication apparatuses connected with the processing apparatus or the input/output apparatus;
a second setting unit that, when the configuration change instruction is received from at least one of the connected communication apparatuses, sets the configuration information in accordance with the configuration change instruction in the second holding unit;
a second instructing unit that, when the configuration information is set in the second holding unit, issues an operation change instruction corresponding to the configuration change to the processing apparatus or the input/output apparatus; and a notifying unit that, when the processing apparatus or the input/output apparatus completes an operation change by the operation change instruction, issues an operation change completion notification to at least one of the connected communication apparatuses, wherein the first holding unit holds, as the configuration information of the communication apparatus, any one of:

first information indicating that each of the two or more communication apparatuses is in a stopped state in which each of the two or more communication apparatuses stops the operation;

second information indicating that each of the two or more communication apparatuses is in a non-redundant state in which each of the two or more communication apparatuses exchanges different data;

third information indicating that each of the two or more communication apparatuses is in a redundant state in which each of the two or more communication apparatuses exchanges same data;

fourth information indicating that each of the two or more communication apparatuses is in a stop transition state in which each of the two or more communication apparatuses is transited from the non-redundant state or the redundant state into the stopped state;

fifth information indicating that each of the two or more communication apparatuses is in a redundant transition state in which each of the two or more communication apparatuses is transited from the non-redundant state into the redundant state; and sixth information indicating that each of the two or more communication apparatuses is in a non-redundant transition state in which each of the two or more communication apparatuses is transited from the redundant state into the non-redundant state.

4. The processing system according to claim 3, wherein the second holding unit holds any one of the first to sixth information for every communication apparatus connected to the processing apparatus or the input/output apparatus as the configuration information of each of the communication apparatuses.

5. The processing system according to claim 3, wherein when one of the communication apparatuses is exchanged in the non-redundant state, in a communication apparatus to be exchanged of the communication apparatuses, when the fourth information is set in the first holding unit, the first instructing unit issues the configuration change instruction in accordance with the fourth information to the processing apparatus and the input/output apparatus connected to the communication apparatus to be exchanged, in the processing apparatus and the input/output apparatus connected to the communication apparatus to be exchanged, when the configuration change instruction is received from the communication apparatus, the second setting unit sets the fourth information in the second holding unit, and the second instructing unit issues an instruction to stop non-redundant transmission to the communication apparatus to be exchanged, and when the non-redundant transmission is stopped, the notifying unit issues the operation change completion notification to the communication apparatus to be exchanged, and the second setting unit sets the first information in the second holding unit, in the communication apparatus to be exchanged, when the operation change completion notification corresponding to the configuration change in accordance with the fourth information is received from all of the one or more processing apparatuses and the one or more input/output apparatuses connected to the communication apparatus and when the managing unit checks that all resources in the communication apparatus are not used, the first setting unit sets the first information in the first holding unit, in a new communication apparatus of the communication apparatuses which is added to the communication apparatuses instead of the communication apparatus to be exchanged, when the fifth information is set in the first holding unit, the first instructing unit issues the configuration change instruction in accordance with the fifth information to the processing apparatus and the input/output apparatus connected to the new communication apparatus;

in the processing apparatus and the input/output apparatus connected to the new communication apparatus, when the configuration change instruction is received from the new communication apparatus, the second setting unit sets the fifth information in the second holding unit, and the second instructing unit issues an instruction to prepare non-redundant transmission to the new communication apparatus, and when the non-redundant transmission is prepared, the notifying unit issues the operation change completion notification to the new communication apparatus, in the new communication apparatus, when the operation change completion notification corresponding to the configuration change in accordance with the fifth information is received from all of the one or more processing apparatuses and the one or more input/output apparatuses connected to the new communication apparatus, the first instructing unit issues a permission notification to permit the non-redundant transmission to the processing apparatus, and the input/output apparatus and the first setting unit sets the second information in the first holding unit, and in the processing apparatus and the input/output apparatus, when the permission notification is received from the new communication apparatus, the second setting unit sets the second information in the second holding unit.

6. The processing system according to claim 3, wherein when a first communication apparatus of the communication apparatuses is changed from the non-redundant state to the redundant state, in the first communication apparatus, when the sixth information is set in the first holding unit, the first instructing unit issues the configuration change instruction in accordance with the sixth information to the processing apparatus and the input/output apparatus connected to the first communication apparatus, in the processing apparatus and the input/output apparatus connected to the first communication apparatus, when the configuration change instruction is received from the first communication apparatus, the second setting unit sets the sixth information in the second holding unit and the second instructing unit issues an instruction to stop the non-redundant transmission and prepare redundant transmission to the first communication apparatus, and when the non-redundant transmission is stopped and the redundant transmission is prepared, the notifying unit issues the operation change completion notification to the communication apparatus, in a second communication apparatus other than the first communication apparatus of the communication apparatuses, when the operation change completion notification corresponding to the configuration change in accordance with the sixth information is received from one of the processing apparatus and the input/output apparatus connected to the second communication apparatus, the first setting unit sets the sixth information in the first holding unit, and when the operation change completion notification corresponding to the configuration change in accordance with the sixth information is received from all of the one or more processing apparatuses and the one or more input/output apparatuses connected to the second communication apparatus and when the managing unit checks that all resources in the second communication apparatus are not used, the first instructing unit issues a permission notification to permit the redundant transmission to the processing apparatus, and the input/output apparatus and the first setting unit sets the third information in the first holding unit, in the first communication apparatus, when the operation change completion notification corresponding to the configuration change in accordance with the sixth information is received from all of the one or more processing apparatuses and the one or more input/output apparatuses connected to the first communication apparatus and when the managing unit checks that all resources in the first communication apparatus are not used, the first instructing unit issues a permission notification to permit the redundant transmission to the processing apparatus, and the input/output apparatus and the first setting unit sets the third information in the first holding unit, and in the processing apparatus and the input/output apparatus, when the permission notification is received from the first communication apparatus, the second setting unit sets the third information in the second holding unit.

7. The processing system according to claim 3, wherein when a first communication apparatus of the communication apparatuses is changed from the redundant state to the non-redundant state, in the first communication apparatus, when the fifth information is set in the first holding unit, the first instructing unit issues the configuration change instruction in accordance with the fifth information to the processing apparatus and the input/output apparatus connected to the first communication apparatus, in the processing apparatus and the input/output apparatus connected to the first communication apparatus, when the configuration change instruction is received from the first communication apparatus, the second setting unit sets the second information on a second communication apparatus other than the first communication apparatus of the communication apparatuses and the fifth information on the first communication apparatus in the second holding unit, the notifying unit issues the non-redundant notification indicating the non-redundancy to the second communication apparatus, and the second instructing unit issues an instruction to stop the redundant transmission and prepare the non-redundant transmission to the communication apparatus, and when the redundant transmission is stopped and the non-redundant transmission is prepared, the notifying unit issues the operation change completion notification to the first communication apparatus, in the second communication apparatus, when the operation change completion notification corresponding to the configuration change in accordance with the fifth information is received from one of the processing apparatus and the input/output apparatus connected to the second communication apparatus, the first setting unit sets the second information in the first holding unit, in the first communication apparatus, when the operation change completion notification corresponding to the configuration change in accordance with the fifth information is received from all of the one or more processing apparatuses and the one or more input/output apparatuses connected to the first communication apparatus and when the managing unit checks that all resources in the first communication apparatus are not used, the first instructing unit issues a permission notification to permit the non-redundant transmission to the processing apparatus and the input/output apparatus, and the first setting unit sets the second information in the first holding unit, and in the processing apparatus and the input/output apparatus, when the permission notification is received from the first communication apparatus, the second setting unit sets the second information on the first communication apparatus in the second holding unit.

8. A communication apparatus in a processing system that includes two or more of the communication apparatuses that communicably connect one or more processing apparatuses and one or more input/output apparatuses to each other to exchange data among the one or more processing apparatuses and the one or more input/output apparatuses, each of the communication apparatuses comprising:

a holding unit that holds configuration information of the communication apparatus;

an instructing unit that, when the configuration information is set in the holding unit, issues a configuration change instruction in accordance with the set configuration information to the one or more processing apparatuses and the one or more input/output apparatuses which are connected to the communication apparatus; and a setting unit that, when an operation change completion notification corresponding to the configuration change instruction is received from the one or more processing apparatuses and the one or more input/output apparatuses connected to the communication apparatus, sets the configuration information in accordance with a state established after a configuration change by the configuration change instruction in the holding unit, wherein the holding unit holds as the configuration information of the communication apparatus, any one of:

first information indicating that each of the two or more communication apparatuses is in a stopped state in which each of the two or more communication apparatuses stops the operation;

second information indicating that each of the two or more communication apparatuses is in a non-redundant state in which each of the two or more communication apparatuses exchanges different data;

third information indicating that each of the two or more communication apparatuses is in a redundant state in which each of the two or more communication apparatuses exchanges same data;

fourth information indicating that each of the two or more communication apparatuses is in a stop transition state in which each of the two or more communication apparatuses is transited from the non-redundant state or the redundant state into the stopped state;

fifth information indicating that each of the two or more communication apparatuses is in a redundant transition state in which each of the two or more communication apparatuses is transited from the non-redundant state into the redundant state; and sixth information indicating that each of the two or more communication apparatuses is in a non-redundant transition state in which each of the two or more communication apparatuses is transited from the redundant state into the non-redundant state.

9. The communication apparatus according to claim 8, further comprising a managing unit that manages a usage condition of a resource in the communication apparatus, wherein the setting unit sets, when the operation change completion notification corresponding to the configuration change is received from the processing apparatus and the input/output apparatus connected to the communication apparatus and when the managing unit checks that all resources in the communication apparatus are not used, the configuration information in accordance with a state established after the configuration change in the holding unit.

10. A processing apparatus in a processing system that includes two or more communication apparatuses that communicably connect one or more of the processing apparatuses to each other to exchange data among the one or more of the processing apparatuses, each of the processing apparatuses comprising:

a holding unit that holds configuration information of the communication apparatuses connected to the processing apparatus;

a setting unit that, when a configuration change instruction is received from at least one of the communication apparatuses, sets the configuration information in accordance with the configuration change instruction in the holding unit;

an instructing unit that, when predetermined configuration information is set in the holding unit, issues an operation change instruction corresponding to a configuration change by the configuration change instruction to the processing apparatus; and a notifying unit that, when the processing apparatus completes an operation change by the operation change instruction, issues an operation change completion notification to at least one of the communication apparatuses, wherein the holding unit holds as the configuration information of the communication apparatus for every communication apparatus connected to the processing apparatus, any one of:

first information indicating that each of the two or more communication apparatuses is in a stopped state in which each of the two or more communication apparatuses stops the operation;

second information indicating that each of the two or more communication apparatuses is in a non-redundant state in which each of the two or more communication apparatuses exchanges different data;

third information indicating that each of the two or more communication apparatuses is in a redundant state in which each of the two or more communication apparatuses exchanges same data;

fourth information indicating that each of the two or more communication apparatuses is in a stop transition state in which each of the two or more communication apparatuses is transited from the non-redundant state or the redundant state into the stopped state;

fifth information indicating that each of the two or more communication apparatuses is in a redundant transition state in which each of the two or more communication apparatuses is transited from the non-redundant state into the redundant state; and sixth information indicating that each of the two or more communication apparatuses is in a non-redundant transition state in which each of the two or more communication apparatuses is transited from the redundant state into the non-redundant state.

\* \* \* \* \*